United States Patent
Petro et al.

(10) Patent No.: US 7,061,152 B2
(45) Date of Patent: Jun. 13, 2006

(54) ROTOR-STATOR STRUCTURE FOR ELECTRODYNAMIC MACHINES

(75) Inventors: John Patrick Petro, Los Altos, CA (US); Ken George Wasson, Foster City, CA (US)

(73) Assignee: NovaTorque, Inc., North Highlands, CA (US)

( * ) Notice: Subject to any disclaimer, the term of this patent is extended or adjusted under 35 U.S.C. 154(b) by 0 days.

(21) Appl. No.: 11/021,417

(22) Filed: Dec. 23, 2004

(65) Prior Publication Data

US 2006/0087188 A1 Apr. 27, 2006

Related U.S. Application Data

(60) Provisional application No. 60/622,258, filed on Oct. 25, 2004.

(51) Int. Cl.
*H02K 21/12* (2006.01)

(52) U.S. Cl. ............................. 310/156.38; 310/156.43

(58) Field of Classification Search ................
310/156.07–156.15, 156.38–156.43, 156.62,
310/254, 261
See application file for complete search history.

(56) References Cited

U.S. PATENT DOCUMENTS

| | | | |
|---|---|---|---|
| 414,659 A | 11/1889 | Seafert | |
| 422,862 A | 3/1890 | Washburn | |
| 439,102 A | 10/1890 | Bradley | |
| 754,066 A | 3/1904 | Hoffman | |
| 829,975 A | 9/1906 | Lincoln | |
| 846,079 A | 3/1907 | Yost | |
| 1,039,197 A | 9/1912 | Roth | |
| 1,557,213 A | 10/1925 | Lee | |
| 1,640,742 A | 8/1927 | Wallace | |
| 1,763,104 A | 6/1930 | Shurtleff | |
| 1,771,281 A | 7/1930 | Wilsing | |
| 1,874,094 A | 8/1932 | Ford | |
| 1,962,832 A | 6/1934 | Neureuther | |
| 2,025,560 A | 12/1935 | Warren | |
| 2,081,993 A | 6/1937 | Gebhardt | |
| 2,141,681 A | 12/1938 | Brueck | |
| 2,378,668 A | 6/1945 | Vickers | |
| 2,480,825 A | 9/1949 | Adolsh | |
| 2,484,001 A | 10/1949 | Raymond | |
| 2,500,730 A | 3/1950 | Yonkers | |
| 2,561,890 A | 7/1951 | Stoddard | |

(Continued)

FOREIGN PATENT DOCUMENTS

CH 400323 4/1966

(Continued)

*Primary Examiner*—Thanh Lam
(74) *Attorney, Agent, or Firm*—Cooley Godward LLP

(57) ABSTRACT

A rotor-stator structure for electrodynamic machinery is disclosed to, among other things, minimize magnetic flux path lengths and to eliminate back-iron for increasing torque and/or efficiency per unit size (or unit weight) and for reducing manufacturing costs. In one embodiment, an exemplary rotor-stator structure can comprise a shaft defining an axis of rotation, and a rotor on which at least two substantially conical magnets are mounted on the shaft. The magnets include conical magnetic surfaces facing each other and confronting air gaps. In some embodiments, substantially straight field pole members can be arranged coaxially and have flux interaction surfaces formed at both ends of those field poles. Those surfaces are located adjacent to the confronting conical magnetic surfaces to define functioning air gaps. Current in coils wound on the field poles provide selectable magnetic fields that interact with magnet flux in flux interaction regions to provide torque to the shaft.

24 Claims, 19 Drawing Sheets

U.S. PATENT DOCUMENTS

| | | |
|---|---|---|
| 2,573,153 A | 11/1951 | Wightman |
| 2,669,687 A | 2/1954 | De Tastes |
| 2,677,256 A | 5/1954 | Donandt |
| 2,677,259 A | 5/1954 | Woodward |
| 2,694,781 A | 11/1954 | Hinz |
| 2,717,969 A | 9/1955 | Buchhold |
| 2,769,106 A | 10/1956 | Dembrowski |
| 2,796,542 A | 6/1957 | Bekey |
| 2,802,959 A | 8/1957 | Powers |
| 2,824,272 A | 2/1958 | Delaporte |
| 3,001,093 A | 9/1961 | Wilcox |
| 3,025,445 A | 3/1962 | Welch |
| 3,153,157 A | 10/1964 | Rabe |
| 3,173,042 A | 3/1965 | Fodor |
| 3,175,111 A | 3/1965 | Orr |
| 3,205,384 A | 9/1965 | Sears |
| 3,223,866 A | 12/1965 | Tiltins |
| 3,241,111 A | 3/1966 | Sandstrom |
| 3,241,304 A | 3/1966 | Mattingly |
| 3,309,547 A | 3/1967 | Woodward |
| 3,319,100 A | 5/1967 | Erickson |
| 3,321,652 A | 5/1967 | Opel |
| 3,356,425 A | 12/1967 | Carrierre |
| 3,360,667 A | 12/1967 | Gordon |
| 3,374,376 A | 3/1968 | Kromrey |
| 3,396,291 A | 8/1968 | Somerville |
| 3,399,002 A | 8/1968 | Atkinson |
| 3,428,837 A | 2/1969 | Morreale |
| 3,471,729 A | 10/1969 | Latta |
| 3,490,816 A | 1/1970 | Lyman |
| 3,519,859 A | 7/1970 | Morreale |
| 3,565,495 A | 2/1971 | Lyman |
| 3,603,826 A | 9/1971 | Saretzky |
| 3,619,014 A | 11/1971 | Quick |
| 3,648,090 A | 3/1972 | Voin |
| 3,651,355 A | 3/1972 | Mason |
| 3,689,787 A | 9/1972 | Saretzky |
| 3,717,780 A | 2/1973 | Hohne |
| 3,723,796 A | 3/1973 | Mason |
| 3,787,100 A | 1/1974 | Habermann |
| 3,822,768 A | 7/1974 | Sebulke |
| 3,863,084 A | 1/1975 | Hasebe |
| 3,936,680 A | 2/1976 | Kuwako |
| 4,031,421 A | 6/1977 | Geiger |
| 4,043,614 A | 8/1977 | Lyman |
| 4,045,696 A | 8/1977 | Lutz |
| 4,047,807 A | 9/1977 | Okano |
| 4,066,922 A | 1/1978 | Hennemann |
| 4,117,359 A | 9/1978 | Wehde |
| 4,152,570 A | 5/1979 | Inoue |
| 4,156,817 A | 5/1979 | Preece |
| D256,351 S | 8/1980 | Schulze |
| 4,221,984 A | 9/1980 | Mason |
| 4,259,603 A | 3/1981 | Uchiyama |
| 4,310,768 A | 1/1982 | Colley |
| 4,328,411 A | 5/1982 | Haller |
| 4,358,693 A | 11/1982 | Palmer |
| 4,378,146 A | 3/1983 | Suzuki |
| 4,390,262 A | 6/1983 | Hirohata |
| 4,395,815 A | 8/1983 | Stanley |
| 4,460,253 A | 7/1984 | Kawai |
| 4,476,395 A | 10/1984 | Cronin |
| 4,480,208 A | 10/1984 | Logie |
| 4,483,570 A | 11/1984 | Inoue |
| 4,491,401 A | 1/1985 | Inaba |
| 4,503,349 A | 3/1985 | Miller |
| 4,543,506 A | 9/1985 | Kawada |
| 4,564,775 A | 1/1986 | Mazzorana |
| 4,577,129 A | 3/1986 | Bertram |
| 4,593,222 A | 6/1986 | Burkel |
| 4,594,539 A | 6/1986 | Michelson |
| 4,601,564 A | 7/1986 | Yamamoto |
| 4,628,220 A | 12/1986 | Flogvall |
| 4,658,228 A | 4/1987 | Leupold |
| 4,663,581 A | 5/1987 | Glennon |
| 4,674,178 A | 6/1987 | Patel |
| 4,713,569 A | 12/1987 | Schwartz |
| 4,731,626 A | 3/1988 | Kawamoto |
| 4,734,604 A | 3/1988 | Sontheimer |
| 4,748,359 A | 5/1988 | Yahara |
| 4,757,224 A | 7/1988 | McGee |
| 4,759,186 A | 7/1988 | Sugden |
| 4,760,314 A | 7/1988 | Mohri |
| 4,763,150 A | 8/1988 | Sumi |
| 4,777,397 A | 10/1988 | Parshall |
| 4,788,369 A | 11/1988 | Marsh |
| 4,788,465 A | 11/1988 | Hertrich |
| 4,802,347 A | 2/1989 | Nystuen |
| 4,879,484 A | 11/1989 | Huss |
| 4,883,996 A | 11/1989 | Aoki |
| 4,885,489 A | 12/1989 | Stuhr |
| 4,918,802 A | 4/1990 | Schaefer |
| 4,920,295 A | 4/1990 | Holden |
| 4,939,397 A | 7/1990 | Morrill |
| 4,962,583 A | 10/1990 | Yang |
| 4,984,972 A | 1/1991 | Clausen |
| 5,033,265 A | 7/1991 | Sugden |
| 5,036,235 A | 7/1991 | Kleckner |
| 5,045,741 A | 9/1991 | Dvorsky |
| 5,047,682 A | 9/1991 | Burgbacher |
| 5,049,771 A | 9/1991 | Challita |
| 5,081,387 A | 1/1992 | Nystuen |
| 5,130,592 A | 7/1992 | Bitsch |
| 5,140,212 A | 8/1992 | Iwasaki |
| 5,212,418 A | 5/1993 | Mason |
| 5,216,308 A | 6/1993 | Meeks |
| 5,233,254 A | 8/1993 | Fisher |
| 5,258,677 A | 11/1993 | Mason |
| 5,283,492 A | 2/1994 | Mason |
| 5,300,848 A | 4/1994 | Huss |
| 5,406,157 A | 4/1995 | New |
| 5,436,518 A | 7/1995 | Kawai |
| 5,486,730 A | 1/1996 | Ludwig |
| 5,514,924 A | 5/1996 | McMullen |
| 5,610,460 A | 3/1997 | Jacobson |
| 5,627,419 A | 5/1997 | Miller |
| 5,674,169 A | 10/1997 | Yang |
| 5,744,887 A | 4/1998 | Itoh |
| 5,751,086 A | 5/1998 | Taghezout |
| 5,767,597 A | 6/1998 | Gondhalekar |
| 5,777,421 A | 7/1998 | Woodward |
| 5,780,950 A | 7/1998 | Yang |
| 5,844,345 A | 12/1998 | Hsu |
| 5,955,806 A | 9/1999 | Devenyi |
| 5,962,948 A | 10/1999 | Hakala |
| 6,013,693 A | 1/2000 | Takahashi |
| 6,025,769 A | 2/2000 | Chu |
| 6,049,148 A | 4/2000 | Nichols |
| 6,057,613 A | 5/2000 | Trago |
| 6,104,115 A | 8/2000 | Offringa |
| 6,157,109 A | 12/2000 | Schiferl |
| 6,194,797 B1 | 2/2001 | Simon |
| 6,236,124 B1 | 5/2001 | Sekiyama |
| 6,246,146 B1 | 6/2001 | Schiller |
| 6,346,755 B1 | 2/2002 | Tong |
| 6,359,357 B1 | 3/2002 | Blumenstock |
| 6,455,975 B1 | 9/2002 | Raad |
| 6,492,753 B1 | 12/2002 | Zepp |
| 6,700,280 B1 | 3/2004 | Geiger |
| 6,720,688 B1 | 4/2004 | Schiller |
| 2004/0119371 A1 | 6/2004 | Laing |

FOREIGN PATENT DOCUMENTS

| | | |
|---|---|---|
| DE | 2433809 | 2/1978 |
| DE | 37 42 502 A1 | 6/1989 |
| DE | 199 54 196 A1 | 6/2000 |
| DE | 101 40 362 A1 | 3/2003 |
| EP | 0208124 A2 | 1/1987 |
| EP | 0251350 A2 | 1/1988 |
| GB | 960879 | 6/1964 |
| JP | 60066658 | 4/1985 |
| JP | 04-026350 | 1/1992 |
| JP | 06-014521 | 1/1994 |
| JP | 06-141527 | 5/1994 |
| JP | 06-351212 | 12/1994 |
| JP | 08-080019 | 3/1996 |
| JP | 10-174399 | 6/1998 |
| JP | 10-174400 | 6/1998 |
| WO | WO 00/48297 A1 | 8/2000 |

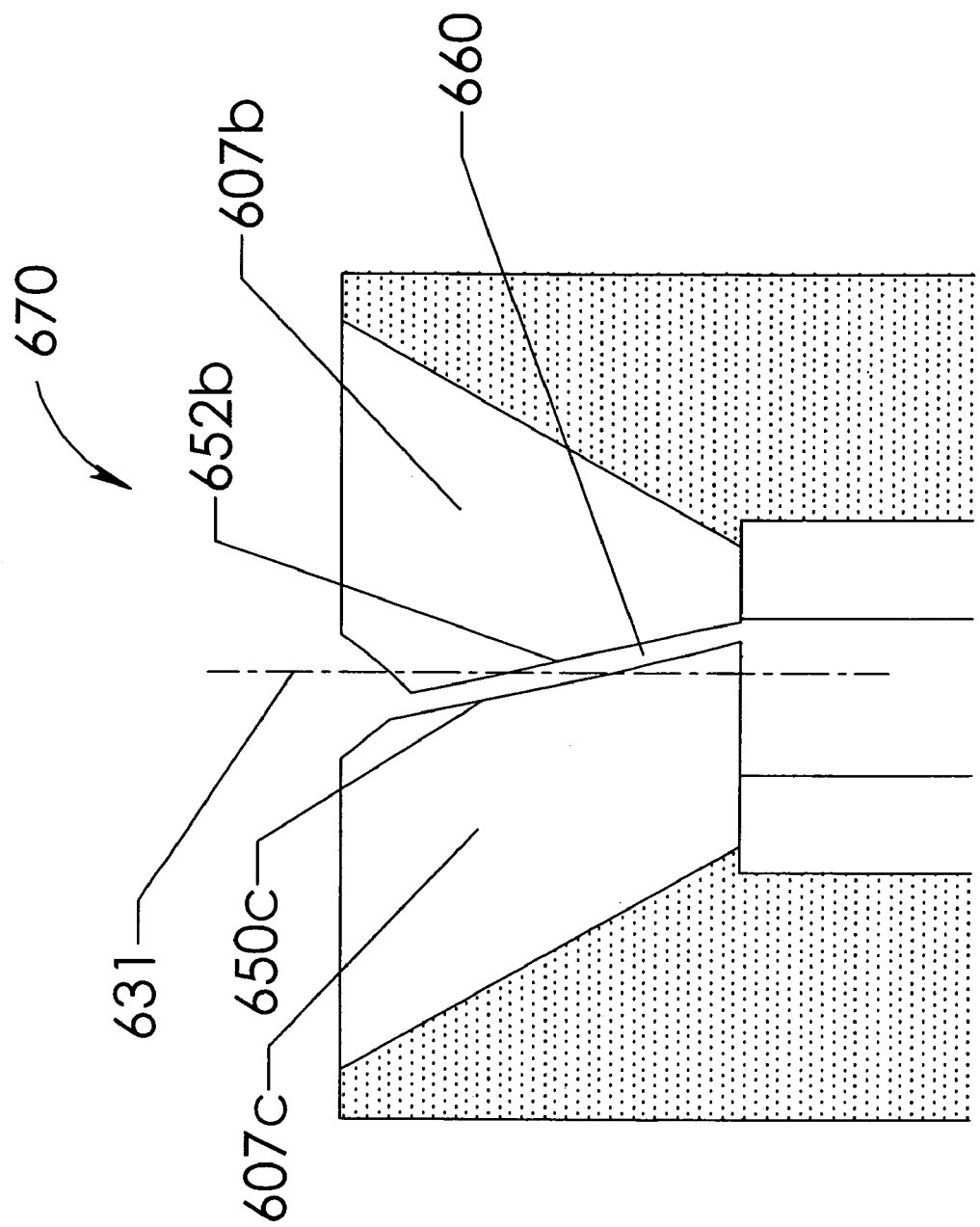

ROTOR-STATOR STRUCTURE FOR ELECTRODYNAMIC MACHINES

CROSS REFERENCE TO RELATED APPLICATION

This application claims the benefit of U.S. Provisional Application No. 60/622,258, entitled "Rotor-Stator Structure for Electric Motors and Generators" and filed on Oct. 25, 2004, the disclosure of which is incorporated herein by reference in its entirety.

BRIEF DESCRIPTION OF THE INVENTION

This invention relates generally to electric motors, alternators, generators and the like, and more particularly, to a rotor-stator structure for motors that, for example, increases output torque per unit size (or per unit weight) either by minimizing the length of magnetic flux paths or by straightening those paths through anisotropic field pole members, or both. Further, the rotor-stator structure conserves resources, such as reducing manufacturing costs, such as by minimizing wastage and by eliminating "back-iron" material.

BACKGROUND OF THE INVENTION

In traditional stator and rotor structures for fractional and sub-fractional horsepower motors, permanent magnets are often integrated into a rotor assembly that typically rotates in the same plane as a ferromagnetic stator structure that provides magnetic return paths for magnet and current-generated flux. Current-generated flux, which is also referred to as Ampere Turn ("AT")-generated flux, is generated by passing a current through a coil winding that is wrapped about a pole region of a stator member structure. While functional, conventional stator and rotor structures of these and other electric motors have several drawbacks, as are discussed next.

FIG. 1 illustrates a traditional electric motor exemplifying commonly-used stator and rotor structures. Electric motor 100 is a cylindrical motor composed of a stator structure 104, a magnetic hub 106 and a shaft 102. The rotor structure of motor 100 includes one or more permanent magnets 110, all of which are attached via magnetic hub 106 to shaft 102 for rotation within stator structure 104. Stator structure 104 typically includes field poles 118, each having a coil winding 112 (only one is shown) that is wound about each field pole 118. Stator structure 104 includes slots 108 used in part to provide a wire passage for winding coil wire about stator field poles 118 during manufacturing. Slots 108 also provide magnetic separation between adjacent field poles 118. Stator structure 104 includes a peripheral flux-carrying segment 119 as part of magnetic return path 116. In many cases, stator structure 104 is composed of laminations 114, which typically are formed from isotropic (e.g., non-grain oriented), magnetically permeable material. Magnetic return path 116, which is one of a number of magnetic return paths in which permanent magnet-generated flux and AT-generated flux is present, is shown as being somewhat arcuate in nature at peripheral flux-carrying segment 119 but includes relatively sharp turns into the field pole regions 118.

One drawback of traditional electric motors, including electric motor 100, is that magnetic return path 116 requires a relatively long length for completing a magnetic circuit for flux emanating from one rotor magnet pole 110 and traversing via magnetic return path 116 to another rotor magnet pole 110. Furthermore, magnetic return path 116 is not a straight line, which is preferred for carrying magnetic flux. As shown, magnetic return path 116 has two ninety-degree turns in the stator path. Magnetic return path 116 turns once from field pole region 118 to peripheral flux-carrying segment 119, and then again from peripheral flux-carrying segment 119 to another field pole region 118. Both of these turns are suboptimal for carrying flux efficiently. As implemented, magnetic return path 116 requires more material, or "back-iron," than otherwise is necessary for carrying such flux between field poles. Consequently, magnetic return paths 116 add weight and size to traditional electric motors, thereby increasing the motor form factor as well as cost of materials to manufacture such motors.

Another drawback of conventional electric motors is that laminations 114 do not effectively optimize the flux density in flux-carrying poles, such as through field poles 118 and stator regions at peripheral flux-carrying segment 119, due to hysteresis losses (or "iron losses"). Hysteresis is the tendency of a magnetic material to retain its magnetization. "Hysteresis loss" is the energy required to magnetize and demagnetize the magnetic material constituting the stator regions, wherein hysteresis losses increase as the amount of magnetic material increases. As magnetic return path 116 has one or more turns of ninety-degrees or greater, the use of anisotropic materials, such as grain-oriented materials, cannot effectively reduce hysteresis losses because the magnetic return path 116 in peripheral flux-carrying segment 119 would cut across the directional orientation of laminations 114. For example, if direction 120 represents the orientation of grains for laminations 114, then at least two portions of magnetic return path 116 traverse across direction 120 of the grain, thereby retarding the flux density capacity of those portions of stator peripheral flux-carrying segment 119. Consequently, anisotropic materials generally have not been implemented in structures similar to stator structure 104 since the flux paths are usually curvilinear rather than straight, which limits the benefits provided by using such materials.

Yet another drawback of conventional electric motors is the relatively long lengths of magnetic return path 116. Changing magnetic fields, such as those developed at motor commutation frequencies, cause eddy currents to develop in laminations 114 in an orientation opposing the magnetic field inducing it. Eddy currents result in power losses that are roughly proportional to a power function of the rate at which the magnetic flux changes and roughly proportional to the volume of affected lamination material.

Other drawbacks of commonly-used electric motors include the implementation of specialized techniques for reducing "cogging," or detent torque, that are not well-suited for application with various types of electric motor designs. Cogging is a non-uniform angular torque resulting in "jerking" motions rather than a smooth rotational motion. This effect usually is most apparent at low speeds and applies additive and subtractive torque to the load when field poles 118 are at different angular positions relative to magnet poles. Further, the inherent rotational accelerations and decelerations cause audible vibrations.

In another type of electric motor, magnetic poles are positioned at relatively large diameters about (or radial distances from) a rotor shaft. These magnetic poles, as well as the permanent magnets giving rise to those magnetic poles, are typically arranged coaxially about the shaft, with adjacent magnetic poles alternating in polarity. An armature disk usually supports the permanent magnets as separate, non-monolithic magnets in a plane perpendicular to the rotor shaft. Structures such as this are designed based on a certain tenet of electric motor design. According to this tenet, an increase in output torque is achieved by increasing the radial distance between the magnetic poles and the rotor shaft. Consequently, the magnetic poles of this type of electric motor are increasingly being positioned at larger distances from the rotor shaft to increase the torque arm distance from the axis of rotation to the air gaps, thereby increasing the output torque. A drawback to this approach is that additional materials are consumed in forming larger motor structures to accommodate the larger torque arm distance, such as those structures that are used to form magnetic flux return paths. These magnetic flux return paths are typically formed using "back-iron" to complete a larger flux path, which is generally circuitous in nature. By adding back-iron to complete a magnetic circuit, the magnetic material volume through which the magnetic flux passes increases, which detrimentally tends to increase the hysteresis and eddy current losses, both of which can be collectively referred to as "core losses." Further, the addition of back-iron to complete a magnetic circuit increases the magnetic flux path, thereby exacerbating core losses. Another drawback to motors of this type is that the motor volume increases as the magnetic poles are positioned farther from the shaft, which in turn, limits the available applications and uses for this type of motor.

"Back-iron" is a term commonly used to describe a physical structure (as well as the materials giving rise to that physical structure) that is often used to complete an otherwise open magnetic circuit. Back-iron structures are generally used only to transfer magnetic flux from one magnetic circuit element to another, such as either from one magnetically permeable field pole to another, or from a magnet pole of a permanent magnet to a magnet pole of another permanent magnet, or both. Further, "back-iron" structures are not generally formed to accept an associated ampere-turn generating element, such as one or more coils.

In view of the foregoing, it would be desirable to provide a rotor-stator structure that minimizes the above-mentioned drawbacks in electric motors and generators, and to increase output torque and efficiency either on a per unit size or per unit weight basis, or both, as well as to conserve resources during manufacturing and/or operation.

SUMMARY OF THE INVENTION

A system, apparatus and method are disclosed for implementing an exemplary rotor-stator structure for use in electrodynamic machines, such as electric motors, generators, alternators, and the like. According to one embodiment of the present invention, a rotor-stator structure for electrodynamic machines comprises conical magnets having conical surfaces arranged axially on an axis of rotation such that the conical surfaces face each other. The conical magnets include at least two conical magnets being positioned so that the directions of polarization of the two conical magnets are in substantially opposite directions. Further, the rotor-stator structure can also include field pole members arranged coaxially to the axis. The field pole members have flux interaction surfaces formed at the ends of the field pole members and adjacent to portions of the conical surfaces that confront the flux interaction surfaces. The flux interaction surfaces define air gaps with the portions of the conical surfaces and are configured to magnetically couple the field pole members to the conical magnets. In some cases, the rotor-stator structure includes a shaft on which the conical magnets are affixed, the shaft defining the axis of rotation. The conical surfaces each can have an angle of inclination from about 10 degrees to about 80 degrees with respect to the axis of rotation. In one embodiment, each of the field pole members further comprises a magnetically permeable material that is continuous from one end of each field pole member to the other end, where at least a portion of each field pole member is configured to accept an element, such as one or more coils, for generating ampere-turn ("AT") flux. In an alternative embodiment, the rotor-stator structure further comprises one or more coils, at least one of which is wound about each of the field pole members to form active field pole members. In some cases, the rotor-stator structure excludes back-iron, thereby decreasing hysteresis losses as well as materials for manufacturing an electrodynamic machine. In another embodiment, at least one of the field pole members of a rotor-stator structure is substantially straight. Substantially straight field pole members can provide a relatively short magnetic flux path between magnets, which may be accompanied by a reduction in the volume of the magnetically permeable material as compared to the use of back-iron in some traditional stator structures. By reducing the volume of magnetically permeable material through which magnetic flux is conducted, hysteresis losses can be decreased.

The field pole members and the conical magnets of an exemplary rotor-stator structure can be arranged to minimize linear deviations in a path portion of a magnetic flux path coincident with a substantially straight line extending from a surface portion of a first conical magnet to a surface portion of a second conical magnet, the path portion terminating at the surface portions. In a specific embodiment, the rotor-stator structure is configured to generate magnetic flux paths consisting essentially of the first conical magnet, the second conical magnet, at least one of the field pole members, and two or more air gaps. The field pole members, in some instances, can comprise laminations to minimize eddy currents, thereby reducing power losses. The laminations can be formed from a substrate composed of a magnetically permeable material in a manner that reduces wastage of the magnetically permeable material. Notably, in certain instances, at least one of the laminations is anisotropic, which can include grain-oriented materials. In one embodiment, the rotor-stator structure further comprises a coil wound about at least one of the field pole members to form at least one active field pole member, where at least the one field pole member is shaped to minimize manufacturing complexity associated with winding the coil on traditional field poles by obviating the need to wind the coil via a slot. In still another embodiment, each of the flux interaction surfaces further comprises a skewed flux interaction surface to reduce field pole gaps between adjacent field pole members, thereby minimizing detent torque. Detent torque can also be reduced by offsetting the directions of polarization of the two conical magnets by about 150 to about 180 degrees. The field pole members, in at least one example of a rotor-stator structure, are stationary while the conical magnets can rotate relative to the field pole members, whereas in other examples, the conical magnets remain stationary and the field pole members rotate relative to the conical magnets.

According to another embodiment of the present invention, a rotor-stator structure for electrodynamic machines having an axis comprises a rotor having at least two substantially conical magnets arranged axially about the axis. The two conical magnets can be spaced apart from each other and can have regions of predetermined magnetic polarization. The magnets each can have confronting conical magnetic surfaces of principal dimension that is substantially at an acute angle to the axis. The confronting conical magnetic surfaces face each other generally, with the magnetic polarizations being in substantially opposite directions. The rotor-stator structure can also include field poles arranged coaxial to the axis and having flux interaction surfaces formed at the ends of the field poles. The flux interaction surfaces are typically located adjacent the confronting magnetic surfaces, which are generally coextensive with the principal dimension thereof, defining functioning air gaps therewith. Each of the field pole members can be magnetically permeable, wherein the flux interaction surfaces are configured to magnetically couple the field pole members to the conical magnets. In at least one instance, one or more field pole members each further comprises a coil about the one or more field pole members, thereby forming one or more active field pole members. In one embodiment, the rotor-stator structure is configured to limit magnetic flux paths to traverse only through two of the conical magnets, the field pole members, the flux interaction surfaces, and the air gaps. As such, back-iron is excluded. In a specific embodiment, the field pole members comprise one or more of silicon-iron alloys, nickel-iron alloys, cobalt-nickel alloys, magnetic-powdered alloys, and soft magnetic composite, whereas the conical magnets can be permanent magnets composed of a magnet material having a recoil permeability less than 1.3 units as expressed in units of the centimeter, the gram, and the second ("CGS"). As an example, the conical magnets can be composed of neodymium iron ("NdFe"), in whole or in part. As other example, the magnets can be composed of ceramic, Samarium Cobalt ("SmCo"), or any other rare earth magnet material.

According to yet another embodiment of the present invention, an exemplary rotor-stator structure for electrodynamic machines comprises a shaft defining an axis of rotation and having a first end portion, a central portion and a second end portion. The rotor-stator structure includes at least a first magnet having a surface contoured as at least a portion of a cone to form a first conical surface, the first magnet having a first direction of polarization and being disposed axially on the shaft at the first end portion. Also, the rotor-stator structure can include a second magnet having a surface contoured as at least a portion of a cone to form a second conical surface, the second magnet having a second direction of polarization and being disposed axially on the shaft at the second end portion such that the first direction of polarization is substantially opposite to the second direction of polarization. Generally, the second conical surface faces, or confronts, the first conical surface. The rotor-stator structure is further composed of a number of field pole members arranged substantially coaxial to the shaft. Each of the field pole members comprises a number of substantially straight laminations, at least one of which is composed of anisotropic material and arranged in parallel with other laminations and in parallel with the axis of rotation. Each of the field pole members has a first pole shoe at its first field pole member end and a second pole shoe at its second field pole member end, the first pole shoe being positioned adjacent to a portion of the first conical surface to form a first flux interaction region and the second pole shoe being positioned adjacent to a portion of the second conical surface to form a second flux interaction region. Further, the rotor-stator structure includes at least one coil wound about at least one of the number of field pole members to form an active field pole member. As such, at least in some cases, the rotor-stator structure is configured to generate at least one magnetic flux path limited to traverse only through the first magnet, the second magnet, the active field pole member and the first and second flux interaction regions. In a specific embodiment, the at least one coil extends substantially the length of the active field pole member in an axial direction for reducing flux leakage from the peripheries of the active field pole member.

In an alternate embodiment, the first pole shoe and the second pole shoe further comprise a first pole face and a second pole face, respectively, wherein at least a portion of the first pole face is contoured to form a first air gap having a gap thickness principally defined by the distance between the portion of the first conical surface and the first pole face, and at least a portion of the second pole face is contoured to form a second air gap having a gap thickness principally defined by the distance between the portion of the second conical surface and the second pole face. The gap thickness is generally no greater than 40% of an average diameter of either the first magnet or the second magnet. In another embodiment, the first magnet and the second magnet each are dipole magnets oriented in a manner so their polarizations differ by an angle between 150 to 180 degrees, wherein each of the dipole magnets is monolithic. In some embodiments, the first magnet and the second magnet each are multipole magnets. An exemplary configuration for a rotor-stator includes three or four field poles and dipole magnets. Another configuration includes six or eight field poles configured to operate with four-pole conical magnets. The rotor-stator structure, in some instances, can be configured to receive electrical power as an electrical current into the at least one coil for implementing an electric motor. In other instances, the rotor-stator structure can be configured to receive mechanical power as rotational motion about the shaft for implementing an electric generator.

According to still yet another embodiment of the present invention, an exemplary rotor-stator structure for electrodynamic machines comprises a shaft defining an axis of rotation, at least two permanent magnets each having at least one conical surface and an outer surface, each of the at least two permanent magnets being affixed coaxially on the shaft such that one of the at least one conical surface faces another, a plurality of sets of coils, and a plurality of ferromagnetic field pole members. The plurality of ferromagnetic field pole members are disposed substantially parallel to the axis, each of the ferromagnetic field pole members having a length along an axial direction, the length substantially extending at least between both of the at least one conical surface of the at least two permanent magnets. Each of the ferromagnetic field pole members also has at least a central portion around which a set of coils of the plurality of sets of coils is wound. Each of the ferromagnetic field pole members has a pole shoe having at least a pole face formed at each end of the ferromagnetic field pole members. Each pole face is generally configured to form a flux interaction region with or via a portion of the at least one conical surface of either one of the at least two permanent magnets.

According to at least one embodiment, an exemplary rotor-stator structure can be disposed within an electric motor to provide more output torque deliverable by such a motor relative to conventional electric motors of the same size and/or weight. In one embodiment, a rotor-stator structure provides a relatively shorter and straighter magnetic path, and a more efficient use of materials than traditional stator-rotor structures for electrodynamic machines. In cases where anisotropic (e.g., grain-oriented materials) lamination materials are used to form field pole members of specific embodiments of the present invention, the inherent magnetic properties of the laminations contribute to an increase of flux density in flux-carrying regions. The elimination or at least reduction in exterior return paths, such as those return paths traditionally implemented using back-iron, therefore saves weight and reduces the overall size of electrodynamic machines implementing various embodiments of the rotor-stator structure of the present invention. In another embodiment, a stator-rotor structure provides a greater motor efficiency than a similarly-sized conventional motor with the same output torque. This efficiency increase is due, at least in part, to lower resistance windings, which translates to lower current-squared-times-resistance (i.e., $I^2*R$) power losses while producing the same ampere turn-generated flux created in similarly-sized packages or motor housings of traditional motors. Further, the rotor-stator structure of the present invention is less complex (e.g., in the coil winding process) and less costly (e.g., due to conservation of materials) to manufacture than conventional motors.

BRIEF DESCRIPTION OF THE FIGURES

The invention is more fully appreciated in connection with the following detailed description taken in conjunction with the accompanying drawings, in which:

FIG. 6C depicts a partial sectional view of the rotor-stator structure of FIGS. 6A and 6B, according to one embodiment of the present invention;

Like reference numerals refer to corresponding parts throughout the several views of the drawings. Note that most of the reference numerals include one or two left-most digits that generally identify the figure that first introduces that reference number.

DETAILED DESCRIPTION OF EXEMPLARY EMBODIMENTS

Definitions

Figure 1:
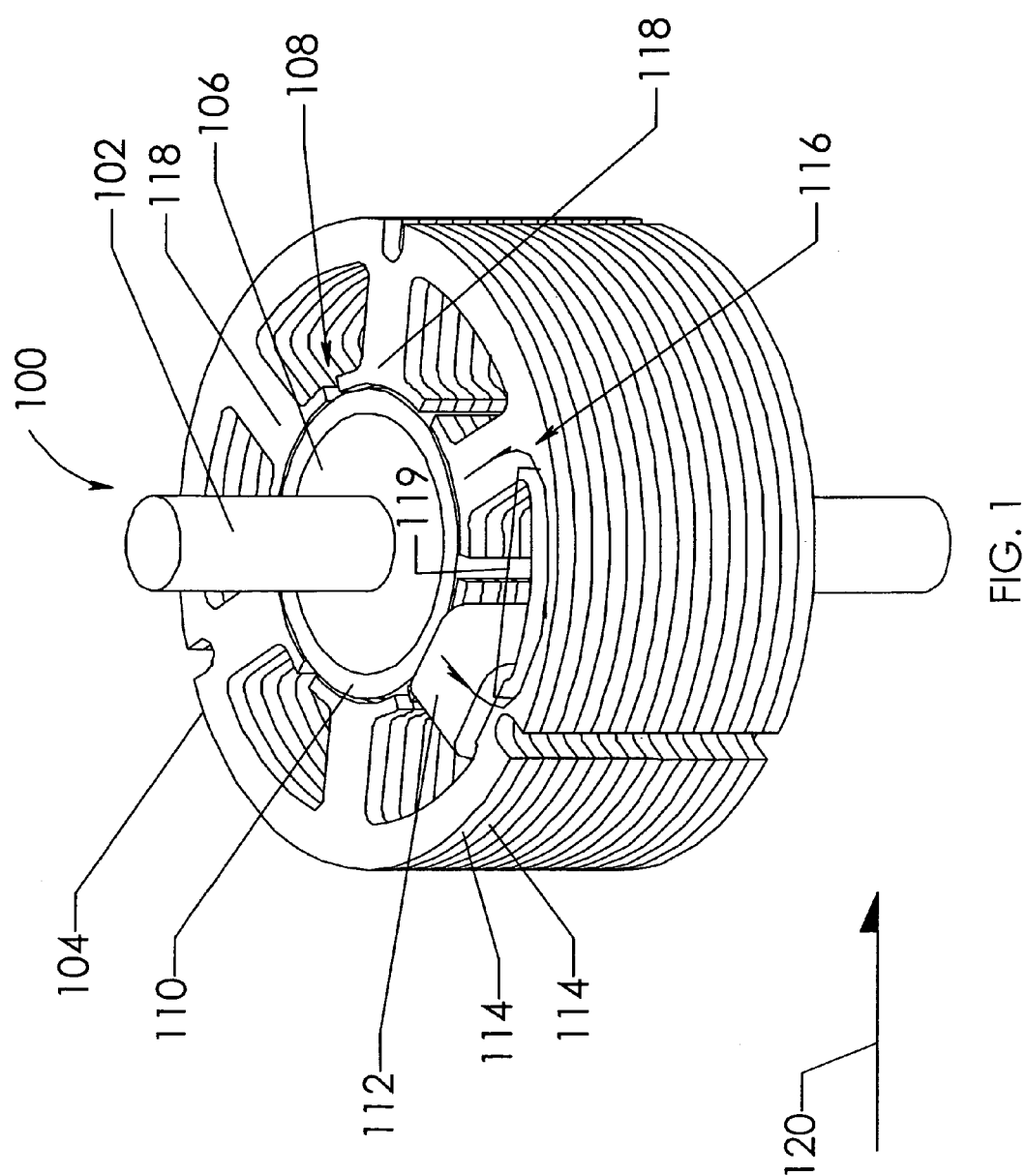
FIG. 1 exemplifies commonly-used stator and rotor structures implemented in a traditional electric motor.

The following definitions apply to some of the elements described with respect to some embodiments of the invention. These definitions may likewise be expanded upon herein.

As used herein, the term "air gap" refers to a space, or a gap, between a magnet surface and a confronting pole face. Such a space can be physically described as a volume bounded at least by the areas of the magnet surface and the pole face. An air gap functions to enable relative rotation between a rotor and a stator, and to define a flux interaction region. Although an air gap is typically filled with air, it need not be so limiting.

As used herein, the term "back-iron" commonly describes a physical structure (as well as the materials giving rise to that physical structure) that is often used to complete an otherwise open magnetic circuit. In particular, back-iron structures are generally used only to transfer magnetic flux from one magnetic circuit element to another, such as either from one magnetically permeable field pole member to another, or from a magnet pole of a first magnet to a magnet pole of a second magnet, or both, without an intervening ampere-turn generating element, such as coil, between the field pole members or the magnet poles. Furthermore, back-iron structures are not generally formed to accept an associated ampere-turn generating element, such as one or more coils.

As used herein, the term "coil" refers to an assemblage of successive convolutions of a conductor arranged to inductively couple to a magnetically permeable material to produce magnetic flux. In some embodiments, the term "coil" can be described as a "winding" or a "coil winding."

As used herein, the term "coil region" refers generally to a portion of a field pole member around which a coil is wound.

As used herein, the term "core" refers to a portion of a field pole member where a coil is normally disposed between pole shoes and is generally composed of a magnetically permeable material for providing a part of a magnetic flux path.

As used herein, the term "field pole member" refers generally to an element composed of a magnetically permeable material and being configured to provide a structure around which a coil can be wound (i.e., the element is configured to receive a coil for purposes of generating magnetic flux). In particular, a field pole member includes a core (i.e., core region) and at least two pole shoes, each of which is generally located near a respective end of the core. Without more, a field pole member is not configured to generate ampere-turn flux. In some embodiments, the term "field pole member" can be described generally as a "stator-core."

As used herein, the term "active field pole member" refers to an assemblage of a core, one or more coils, and at least two pole shoes. In particular, an active field pole member can be described as a field pole member assembled with one or more coils for selectably generating ampere-turn flux. In some embodiments, the term "active field pole member" can be described generally as a "stator-core member."

As used herein, the term "ferromagnetic material" refers to a material that generally exhibits hysteresis phenomena and whose permeability is dependent on the magnetizing force. Also, the term "ferromagnetic material" can also refer to a magnetically permeable material whose relative permeability is greater than unity and depends upon the magnetizing force.

As used herein, the term "field interaction region" refers to a region where the magnetic flux developed from two or more sources interact vectorially in a manner that can produce mechanical force and/or torque relative to those sources. Generally, the term "flux interaction region" can be used interchangeably with the term "field interaction region." Examples of such sources include field pole members, active field pole members, and/or magnets, or portions thereof. Although a field interaction region is often referred to in rotating machinery parlance as an "air gap," a field interaction region is a broader term that describes a region in which magnetic flux from two or more sources interact vectorially to produce mechanical force and/or torque relative to those sources, and therefore is not limited to the definition of an air gap (i.e., not confined to a volume defined by the areas of the magnet surface and the pole face and planes extending from the peripheries between the two areas). For example, a field interaction region (or at least a portion thereof) can be located internal to a magnet.

As used herein, the term "generator" generally refers to an electrodynamic machine that is configured to convert mechanical energy into electrical energy regardless of, for example, its output voltage waveform. As an "alternator" can be defined similarly, the term generator includes alternators in its definition.

As used herein, the term "magnet" refers to a body that produces a magnetic field externally onto itself. As such, the term magnet includes permanent magnets, electromagnets, and the like.

As used herein, the term "motor" generally refers to an electrodynamic machine that is configured to convert electrical energy into mechanical energy.

As used herein, the term "magnetically permeable" is a descriptive term that generally refers to those materials having a magnetically definable relationship between flux density ("B") and applied magnetic field ("H"). Further, "magnetically permeable" is intended to be a broad term that includes, without limitation, ferromagnetic materials, soft magnetic composites ("SMCs"), and the like.

As used herein, the term "pole face" refers to a surface of a pole shoe that faces at least a portion of the flux interaction region (as well as the air gap), thereby forming one boundary of the flux interaction region (as well as the air gap). In some embodiments, the term "pole face" can be described generally as a "stator surface."

As used herein, the term "pole shoe" refers to that portion of a field pole member that facilitates positioning a pole face so that it confronts a rotor (or a portion thereof), thereby serving to shape the air gap and control its reluctance. The pole shoes of a field pole member are generally located near each end of the core starting at or near a coil region and terminating at the pole face. In some embodiments, the term "pole shoe" can be described generally as a "stator region."

As used herein, the term "soft magnetic composites" ("SMCs") refers to those materials that are comprised, in part, of insulated magnetic particles, such as insulation-coated ferrous powder metal materials that can be molded to form an element of the rotor-stator structure of the present invention.

Discussion

Figure 2:
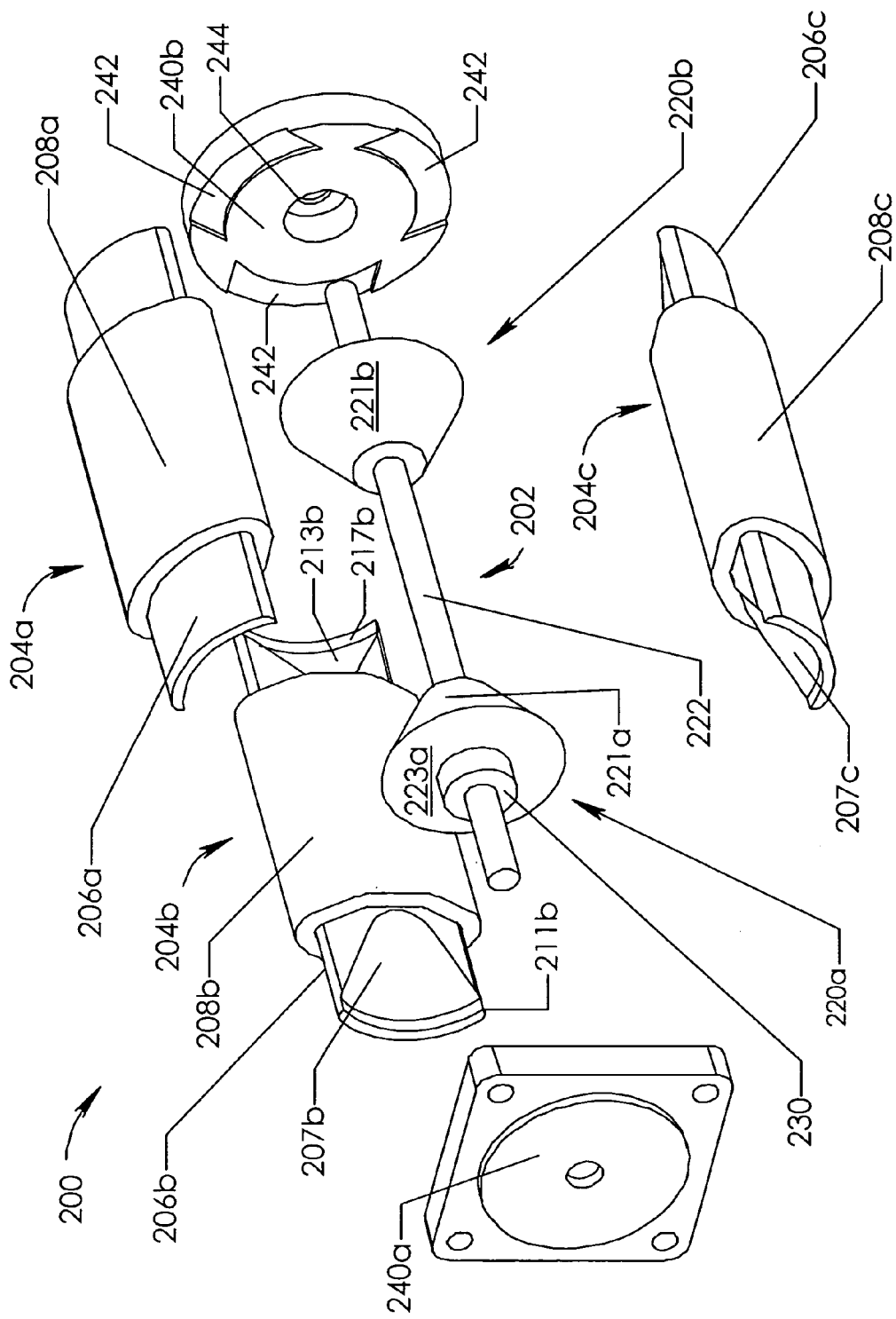
FIG. 2 is an exploded view of an exemplary rotor-stator structure in which the magnets are conical in shape, according to one embodiment of the present invention.

FIG. 2 is an exploded view of an exemplary rotor-stator structure in accordance with a specific embodiment of the present invention. In this example, rotor-stator structure 200 is configured to increase generated torque per unit size (or per unit weight) for electric motor implementations either by minimizing the length of magnetic flux paths or by straightening those paths through field pole members, or both. In some embodiments, rotor-stator structure 200 implements straight paths to provide a relatively low reluctance flux path inside those field pole members as compared to conventional magnetic return path designs that require magnetic flux to turn sharply, such as at an angle of ninety-degrees or greater, to enter field pole regions. Substantially straight field pole members also provide relatively short magnetic flux path portions between air gaps. As such, rotor-stator structures of various embodiments of the present invention enable electrodynamic machines to operate with low magnetic losses and increased efficiency.

In this example, rotor-stator structure 200 includes a rotor assembly 202 and a number of active field pole members 204 (i.e., active field pole members 204a, 204b, and 204c), whereby active field pole members 204 are configured to magnetically couple to and drive magnets of rotor assembly 202. Rotor assembly 202 includes two conical magnets 220 mounted on or affixed to a shaft 222 such that at least a portion of a conical magnet surface 221a on conical magnet 220a faces at least a portion of a conical magnet surface 221b on conical magnet 220b. In particular, the smaller diameter ends (i.e., nearest the cones vertices, conceptual or otherwise) of the conical magnets 220 face each other. Further, conical magnets 220 are each positioned adjacent to one group of ends of active field pole members 204. In various embodiments of the present invention, conical magnet surfaces 221a and 221b each have an angle of inclination with respect to the axis of rotation, where the angle is from about 5 degrees to about 85 degrees. In a specific embodiment, the angle of inclination can be from about 10 degrees to about 80 degrees. In at least one embodiment, the angle of inclination is about 30 degrees with respect to the axis of rotation, for example, when conical magnets 220 are composed of relatively high performing magnet material (e.g., magnets having relatively high values of maximum energy product and "Br," and high coercivity, as is discussed below).

Each of active field pole members 204 includes a field pole member 206 and an insulated coil 208 wrapped around a respective field pole member 206. Field pole members 206 are positioned coaxial about an axis of rotation, which can be defined by the axis of shaft 222. Coils 208a, 208b and 208c are generally wound about the central portions of field pole members 206a, 206b and 206c, respectively, to produce ampere turn-generated magnetic flux in field pole members 206 when the coils 208 are energized with current. In at least one embodiment, one or more active field pole members 204 constitute, at least in part, a stator assembly (not shown). At each end region of active field pole members 204 are pole faces 207, each of which is located adjacent to and confronting at least a portion of the conical magnet surfaces of the conical magnets 220, thereby defining functional air gaps between magnet surfaces (or portions thereof) and pole faces. According to a specific embodiment of the present invention, pole faces 207 are contoured to mimic the surfaces of a magnet, such as that of conical magnet 220a. For example, pole face 207b is a concave surface resembling the curvature of that of a convex surface of conical magnet 220a. In one embodiment of the present invention, an optional extended end, such as an extended end 211b, extends longitudinally from field pole members 206 to extend over and/or past outer surfaces of conical magnets 220. As another example, extended end 217b is configured to extend past the outer surface of conical magnet 220b for insertion into one of grooves 242 to construct rotor-stator structure 200.

As either rotor assembly 202 or the number of active field pole members 204 can be configured to rotate in relation to the other, rotor-stator structure 200 can optionally include bearings 230 and both a front mounting plate 240a and a rear mounting plate 240b. In a specific embodiment, mounting plates 240a and 240b can be made of non-magnetic and/or non-electrically conductive materials. Cavities 244 in mounting plates 240a and 240b are designed to receive bearings 230, and grooves 242 are designed to receive at least a portion of an extended end, such as extended end 217b, of an active field pole member. In some cases, grooves 242 confine the movement of active field pole members 204 to maintain a proper position with respect to rotor assembly 202. A protective housing (not shown) can be added to protect both rotor assembly 202 and field pole members 204 and can also serve as a heat sink for one or more coils 208.

Note that although each field pole member 206 is shown to be wrapped by insulated coil 208, fewer than all of field pole members 206 can be wrapped by coil 208, according to a specific embodiment. For example, coils 208b and 208c can be omitted from active field pole members 204b and 204c, respectively, to form an electrodynamic machine that, for example, costs less to manufacture than if coils 208b and 208c were included. Without coils 208b and 208c, members 204b and 204c constitute field pole members rather than active field pole members. Also note that although field pole members 206a, 206b and 206c are shown as straight field pole members, there is no requirement that field pole members 206a, 206b and 206c be straight or substantially straight. In some embodiments, one or more of field pole members 206a, 206b and 206c can be shaped to implement non-straight field pole members to convey flux in other than a straight flux path. For example, field pole members 206a, 206b and 206c can be shaped to position coils 208 closer to shaft 222, thereby decreasing the volume of an electrodynamic machine implementing rotor-stator structure 200.

Figure 3:
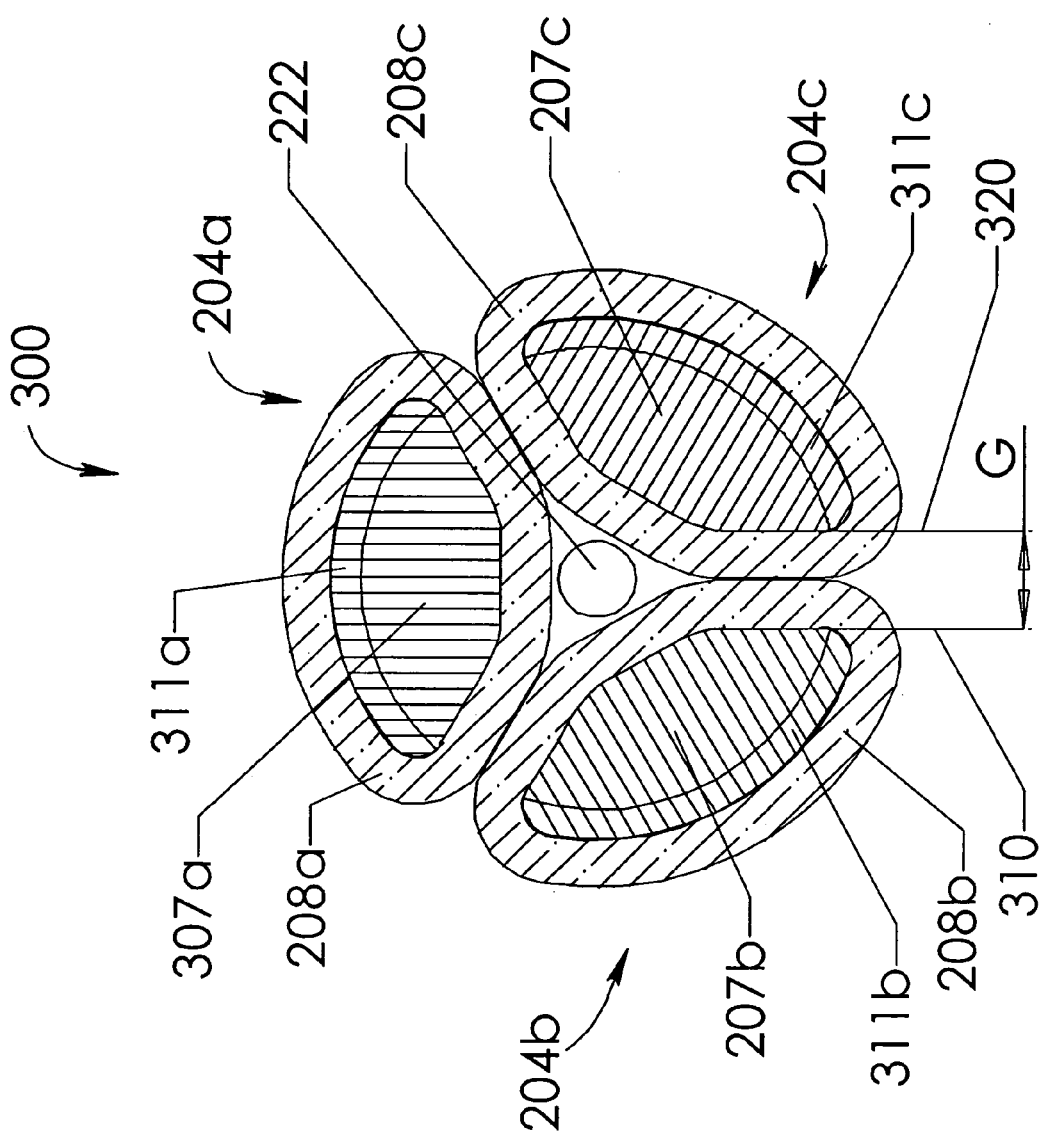
FIG. 3 depicts an end view for the rotor-stator structure of FIG. 2 without a magnet to illustrate the orientation of the pole faces that are configured to interact via an air gap with a confronting magnetic surface of a conical magnet, according to one embodiment of the present invention.

FIG. 3 depicts an end view 300 of rotor-stator 200 illustrating orientation of the pole faces that are configured to interact via an air gap with a confronting magnetic surface of conical magnet 220a, according to one embodiment of the present invention. Absent from FIG. 3 is front mounting plate 240a, bearings 230 and conical magnet 220a, all of which are omitted to depict the end views of both the active field pole member and coil shapes, as well as the field pole gaps ("G") between the field poles. As shown, coils 208a, 208b, and 208c respectively encompass field pole members 206a, 206b and 206c to form active field pole members 204a, 204b and 204c, all of which are compactly positioned to increase the packing density of a motor or generator implementing rotor-stator structure 200 (as compared to conventional motors using coil windings that typically are wound using slots 108 of FIG. 1). FIG. 3 also depicts edges of extended ends 311a, 311b, and 311c, and pole faces 307a, 207b, and 207c of respective active field pole members 204a, 204b and 204c. Pole faces 307a, 207b, and 207c are positioned to form magnetic air gaps between each of those pole faces, or surfaces, and at least a portion of the conical magnet surface of conical magnet 220a. Further, field pole gaps are defined by the sides (or edges) of the field pole members that constitute active field pole members 204a, 204b and 204c. For example, gap "G" represents any of the field pole gaps as defined, for example, by planes 310 and 320 extending from sides of respective field pole members 206b and 206c (FIG. 2).

Figure 4:
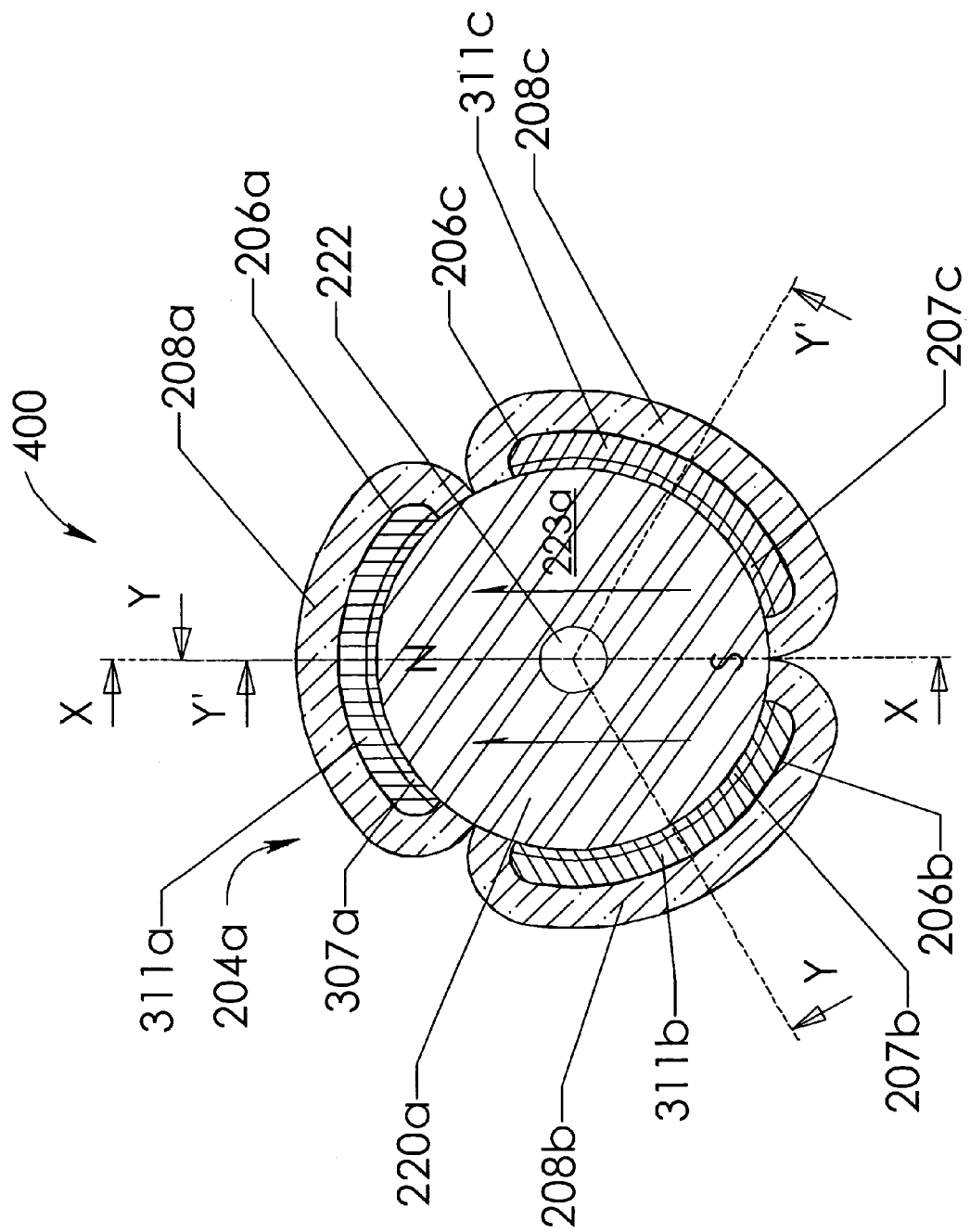
FIG. 4 depicts another end view for the rotor-stator structure of FIG. 2 illustrating a conical magnet positioned adjacent to pole faces in accordance with an embodiment of the present invention.

FIG. 4 depicts another end view 400 of rotor-stator 200 and conical magnet 220a positioned adjacent to pole faces 307a, 207b, and 207c (FIG. 3) in accordance with an embodiment of the present invention. As shown, outer magnet surface 223a of conical magnet 220a is visible, as are the protruding edges of extended ends 311a, 311b, and 311c and coils 208. Note that in this example, conical magnet 220a is a dipole magnet (e.g., a permanent magnet) having a north pole ("N") and a south pole ("S"). Also, FIG. 4 defines three sectional views. The first sectional view, X—X, cuts straight through as a centerline bisecting field pole member 206a and coil 208a and then passes through a field pole gap between other field pole members 206b and 206c. A second section view, Y—Y, bisects field pole member 206a and coil 208a and then passes through field pole member 206b and coil 208b. A third view section view, Y'—Y', which is similar to the second section view, Y—Y, bisects field pole member 206a and coil 208a and then passes through field pole member 206c and coil 208c. Section view X—X is shown in FIG. 5A, whereas views Y—Y and Y'—Y' produce similar drawings, both of which are depicted in FIG. 5B.

Figure 5A:
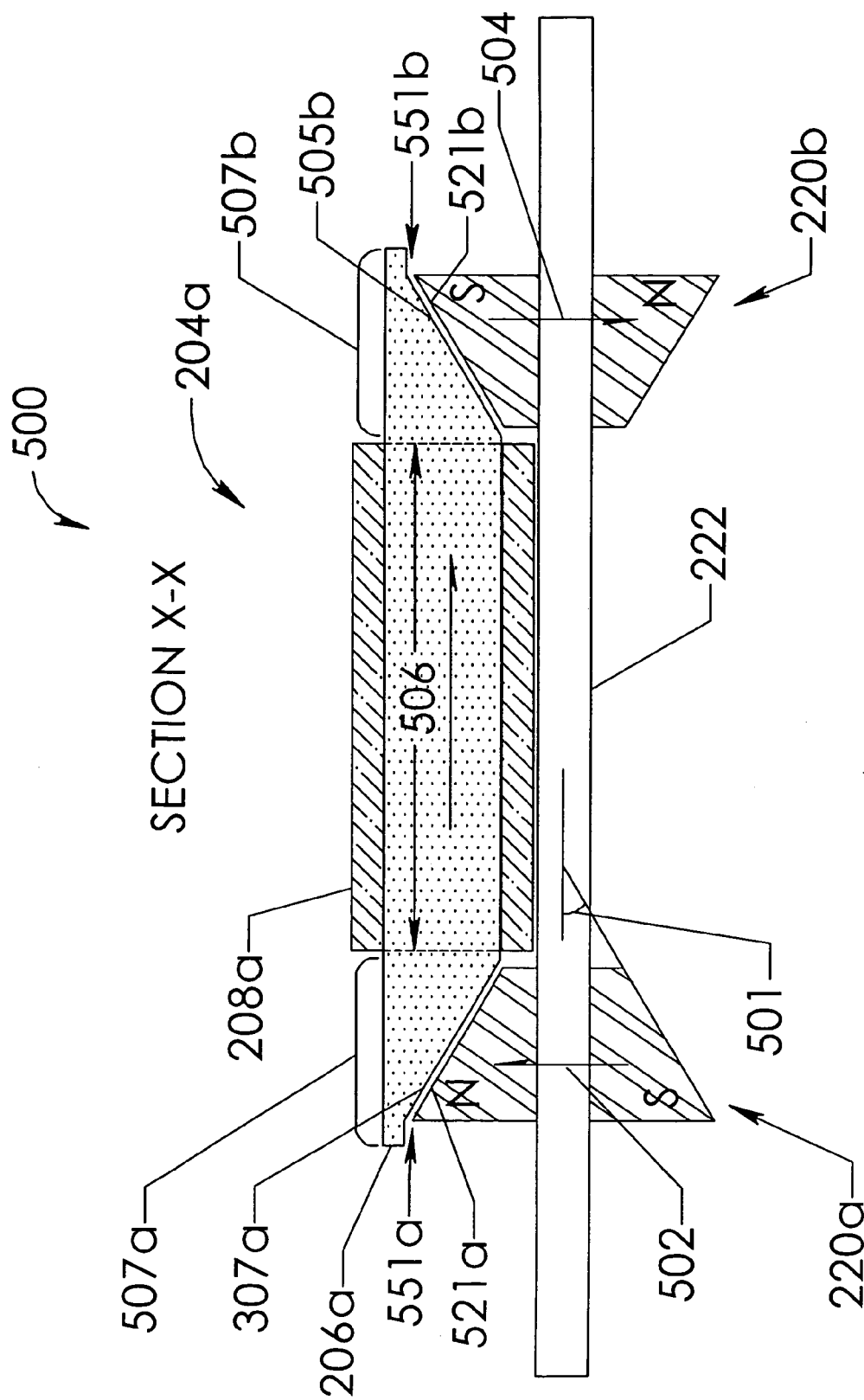
FIGS. 5A and 5B depict sectional views illustrating an exemplary magnetic flux path, according to at least one embodiment of the present invention.
Figure 5B:
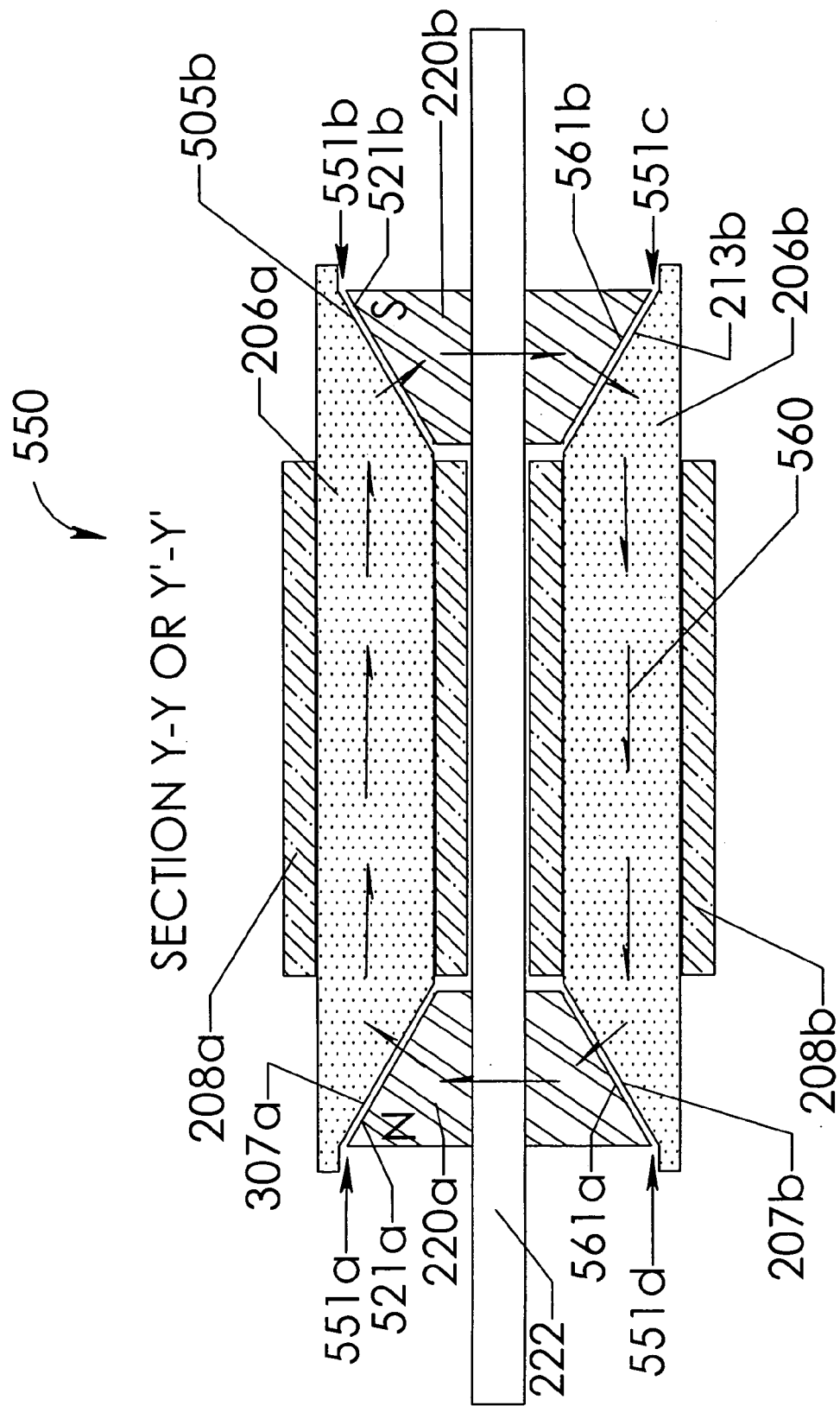

FIGS. 5A and 5B depict sectional views illustrating an exemplary magnetic flux path, according to at least one embodiment of the present invention. FIG. 5A depicts a cross section of active field pole member 204a of rotor-stator structure 500, the cross section showing a sectional view X—X of coil 208a and field pole member 206a. In this example, active field pole member 204a includes pole faces 307a and 505b, pole shoes 507a and 507b, a coil region 506 and coil 208a. In view X—X of FIG. 5A, conical magnets 220a and 220b are diametrically magnetized in opposite directions and are positioned adjacent to respective pole shoes 507a and 507b of field pole member 206. Correspondingly, pole face 307a of pole shoe 507a forms a magnetic air gap 551a with at least a portion 521a of magnet surface 221a, with portion 521a confronting pole face 307a and shown as a cross-section. Similarly, pole face 505b of pole shoe 507b forms a magnetic air gap 551b with at least a portion 521b of magnet surface 221b, with portion 521b confronting pole face 505b and shown as a cross-section. Further, coil 208a encloses a coil region 506 of field pole member 206a, whereby coil region 506 is defined approximately by the axial length of coil 208a surrounding a portion of field pole member 206a. Absent in FIG. 5A is a depiction of one or more field interaction regions, which can encompass a space larger than an air gap, such as air gap 551a, and can extend into, for example, conical magnet 220a.

In at least one embodiment of the present invention, at least one of magnet surfaces 521a and 521b of respective conical magnets 220a and 220b can be defined by an angle of inclination ("θ") 501, which is an angle with respect to an axis of rotation. In the example shown, the axis of rotation is coterminous with shaft 222. In a specific embodiment, angle of inclination ("θ") 501 is 30 degrees from shaft 222.

With opposite polarizations, conical magnet 220a is polarized with its north pole ("N") pointing in direction 502, and conical magnet 220b is polarized with its north pole ("N") pointing in direction 504. In some embodiments, conical magnets 220a and 220b are diametrically magnetized in exactly opposite directions (i.e., 180 degrees between directions 502 and 504). But in other embodiments, directions 502 and 504 can be offset to any angle between those directions other than 180 degrees, for example, to reduce detent torque ("cogging"). In a specific embodiment, directions 502 and 504 are offset to an angle between from about 150 degrees to about 180 degrees.

FIG. 5B depicts cross sections of active field pole member 204a and either active field pole member 204b or active field pole member 204c, and depicts a magnetic flux path, according to one embodiment of the present invention. For ease of discussion, only view Y—Y will be discussed. View Y—Y is sectional view of coil 208a and field pole 206a passing though coil 208b and field pole 206b. Magnetic flux path 560 passes through both field pole members 206a and 206b and through both conical magnets 220a and 220b. For purposes of illustration, magnetic flux path 560 (or flux path) may be described as comprising two flux paths that are combined by the principle of superposition. Conical magnets 220a and 220b form the first flux path (i.e., permanent magnet-generated flux), whereas flux developed by amp-turns of the coil form the second flux path (i.e., ampere turn-generated flux). In this example, magnet flux as the first flux path exits the north pole ("N") of conical magnet 220a and crosses air gap 551a to enter pole face 307a (FIG. 3), the north pole coinciding with surface portion 521a, which confronts pole face 307a. The first flux path then traverses longitudinally through field pole member 206a and then exits pole face 505b at the end of field pole member 206a adjacent to conical magnet 220b. The first flux path continues by crossing air gap 551b and enters the south pole ("S") of conical magnet 220b, the south pole generally coinciding with a surface portion 521b of magnet surface 221b and confronts pole face 505b. The first flux path passes through conical magnet 220b to its north pole, which generally coincides with a surface portion 561b of magnet surface 221b that confronts pole face 213b. Next, the first flux path crosses air gap 551c and enters pole face 213b (FIG. 2). From there, the first flux path returns through field pole member 206b to pole face 207b from which it exits, crosses air gap 551d, and then enters the south pole of conical magnet 220a, thereby completing the first flux path. Generally, the south pole of conical magnet 220a coincides with a surface portion 561a of magnet surface 221a (FIG. 2) that is confronting pole face 207b. Note that in the case shown, the flux exiting pole face 207b is equivalent to that flux exiting pole face 207c. Note that no supplemental structure or material need be required to form any portion of magnetic flux path 560. As such, rotor-stator structure 550 does not include back-iron.

In a specific embodiment, the diameters of conical magnets 220 are set so that the length of the flux path in each of conical magnets 220 is relatively large with respect to the four air gaps 551a to 551d, thereby establishing a favorable magnet load line. Note that each of the four air gaps 551a to 551d provides for a flux interaction region to facilitate magnetic flux interaction between (or through) pole faces and the magnet. Note further that a flux path in either conical magnet 220a or 220b is shown to align along the axis of magnetization (i.e., from the south pole to the north pole), which can contribute to low magnet manufacturing costs and to magnets that can generate a relatively high output torque per unit volume (or size). The coercivity of the magnet, which is the property of the magnet that determines how well a magnet will keep its internal flux alignment in the influence of strong external magnetic fields, can be optimally selected by using appropriate magnet materials for a specific application.

In at least one embodiment, rotor-stator structure 550 (FIG. 5B) generates at least a portion of magnetic flux path 560 that extends substantially linearly from about surface portion 521a of the magnet surface of first conical magnet 220a to about surface portion 521b of the magnet surface of second conical magnet 220b. In one instance, the portion of the magnetic flux path consists essentially of surface portion 521a of first conical magnet 220a, surface portion 521b of the second conical magnet 220b, at least one of the field pole members, such as field pole member 206a, and two or more air gaps, such as air gaps 551a and 551b.

In at least one embodiment of the present invention, conical magnets 220a and 220b can have at least the following two magnetic properties. First, conical magnet 220a and 220b are able to produce magnetic flux, such as measured in terms of flux density, "B," with CGS units of Gauss. "CGS" refers to units described in terms of the centimeter, the gram, and the second. Second, the permanent magnet materials of conical magnet 220a and 220b are such that the magnets resist demagnetization. Materials that have an ability to highly resist demagnetization are often described as having "high coercivity," as is well known in the art. Suitable values of demagnetizing fields can be used to drive a specific magnet material flux density output to zero. As such, magnet materials that have relatively high values of coercivity generally indicate that a magnet material is capable of withstanding large values of adverse external magnetic field intensities without suffering demagnetization effects. In a specific embodiment, conical magnet 220a and 220b are composed of magnet materials having a recoil permeability value relatively close to 1.00 and sufficient coercivity, Hd, under operating conditions as to be reliable in reasonably expected conditions of operation.

Magnet materials are often characterized in part by a maximum energy product of such materials. In addition, magnet materials may be characterized by "Br," which is the magnetic flux density output from a magnet material when measured in a closed circuit and no measured external magnetic fields are being applied to that magnetic material. That maximum flux density value is frequently denoted as "Br." A high value of Br indicates that a magnet material is capable of large magnetic flux production per pole area (i.e., a high flux density). In at least one embodiment, conical magnets 220a and 220b use magnets having high flux production capability (e.g., having high values of "Br") in configurations where relatively high torque is desired in relatively small device volumes.

In various embodiments, conical magnets 220a and 220b (or other permanent magnets) use high-valued Br magnets that can be relatively short in the axial direction and use a cone angle of about 30 degrees, for example, from the axis of rotation. But in some embodiments, conical magnets 220a and 220b (or other magnets suitable for practicing the present invention) use magnet materials having lower cost and lower values of Br. In this case, the magnets generally are implemented with an air gap having a relatively larger area than those associated with higher values of Br. In particular, an increased area for an air gap is formed by increasing the axial length of a magnet, thereby increasing the surface area of a magnetic surface confronting a respective pole face. As such, lesser cone angles (e.g., less than 30 degrees) in a same outer diameter device (e.g., motor housing) can be used, albeit longer in the axial direction. Although the output torque performance, and Km, can remain the same over many embodiments, the manufacturing cost can be less in the low-valued Br version even though there can be an increase in axial length.

While various embodiments of the present invention cover a multitude of design motor and/or generator designs using any of known available magnet materials, at least one embodiment uses magnet materials with low ratios of values of B to values of adverse applied field intensity, such ratios, as is typically specified in many magnet material data sheets, being measured at the respective material's Br point, those ratios defining the "recoil permeability at Br" of such materials. While in some cases magnet materials need not only be limited to high values of coercivity, the magnet materials should exhibit predictable output flux densities when subjected to expected adverse magnetic field or thermal conditions. As such, the value of "recoil permeability" can be at least one factor when considering a motor and/or generator design using an exemplary rotor-stator structure, according to one embodiment of the present invention.

Recoil permeability is generally an expression of the relationship between values of B and the values of adverse applied field intensity. The values of recoil permeability are typically evaluated in terms of CGS units (because the permeability of air is 1.0 in CGS units) and can be determined by dividing a value of B (e.g., expressed in Gauss), near or at Br, by a value of adverse applied field intensity (e.g., H, near or at Hc, expressed in Oerstead). For some magnet materials, an average recoil permeability value can be determined and may be useful in magnet material selection. In one embodiment, recoil permeability can be defined for various magnetic materials by Magnetic Materials Producers Association ("MMPA") Standard 0100-00, as maintained by the International Magnetics Association ("IMA"). Note that recoil permeability can also be described in terms of MKS units (i.e., meter, kilogram, and second).

Generally, values of recoil permeability are not less than one when expressed in CGS units. The closer that a recoil permeability value is to 1.0, however, the higher the coercivity can be for a specific measured material. In most embodiments of the present invention, a value of recoil permeability is typically less than 1.3. Typical high-coercivity magnet materials, such as magnets composed of neodymium-iron ("NdFe") and variants thereof, can have a recoil permeability value of about 1.04 in CGS units. An example of such a variant is Neodymium-Iron-Boron, or "NdFeB." Common low-cost ceramic magnets, such as those composed of ferrite ceramic, can have a ratio value of about 1.25, which permits ceramic magnets to perform adequately in most applications. Note that the average recoil permeability of typical high performance ceramic magnets is usually within a range of 1.06 to 1.2 in CGS units, more or less.

Coils 208 wound around each of field pole members 206 form the second flux path. In this example, the flux generated by the ampere-turns in coils 208a and 208b of FIG. 5B travels in a similar path to the permanent magnet flux, with the exception that conical magnets 220a and 220b have effective properties similar to that of air as viewed by the ampere turn-generated flux. As such, the ampere-turn flux generated within field pole member 206a (e.g., within coil region 506) is present at a pole face adjacent to conical magnet 220b of FIGS. 5A and 5B.

Figure 5C:
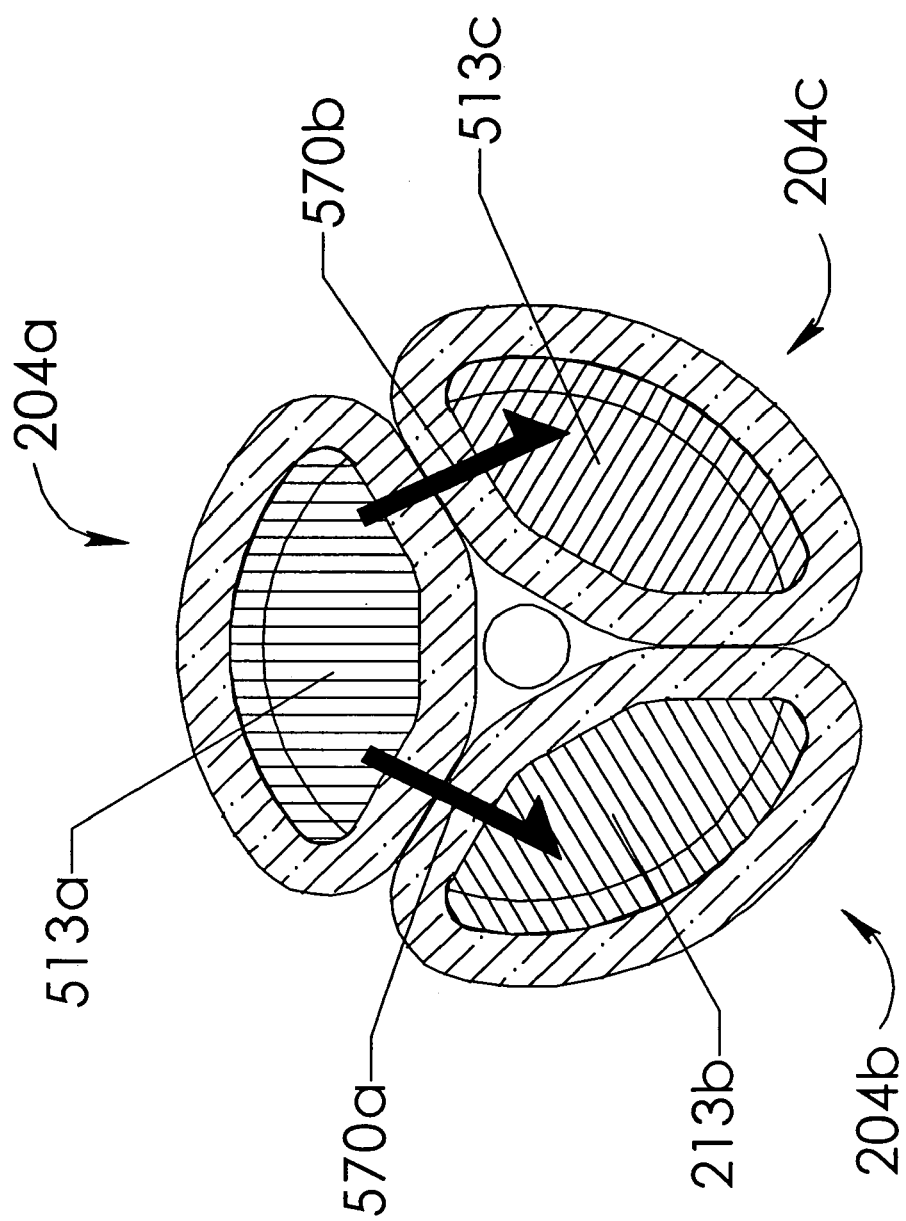
FIG. 5C depicts an example of a second flux path exiting a pole face of a stator member generating an ampere-turn magnetic flux, according to one embodiment of the present invention.

FIG. 5C depicts an example of a second flux path exiting a pole face of the active field pole member that generates that ampere-turn magnetic flux, according to one embodiment of the present invention. In this figure, ampere-turn ("AT")-generated flux is generated in active field pole member 204a and then exits from pole face 513a by dividing approximately in half to form flux 570a and 570b. Then, ampere-turn flux 570a enters pole face 213b, and ampere-turn flux 570b enters pole face 513c. Then, respective portions of the second flux path then travel longitudinally through the other field pole members (e.g., field pole members 206b and 206c) to the other ends of those other field pole members to return to active field pole member 204a, which initially generated the second flux path.

Figure 5D:
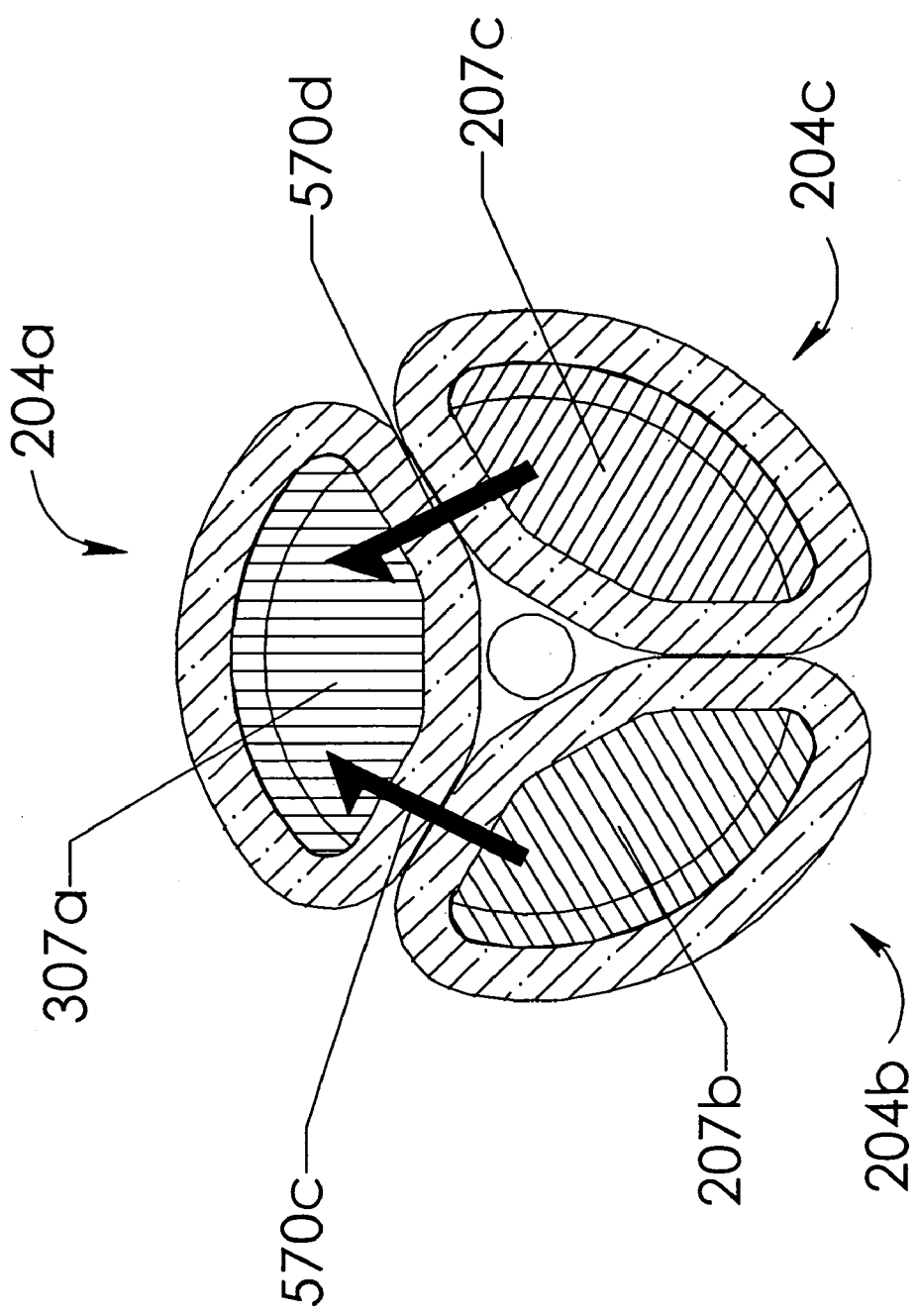
FIG. 5D depicts an example of a second flux path(s) entering a pole face of an active field pole member that originally generated the ampere-turn magnetic flux of FIG. 5C, according to one embodiment of the present invention.

FIG. 5D depicts an example of the second flux path(s) returning to a pole face of the active field pole member that generated the ampere-turn magnetic flux, according to one embodiment of the present invention. As shown, ampere-turn magnetic flux 570c and 570d exit respective pole faces 207b and 207c to enter pole face 307a, thereby completing the magnetic circuit of the second flux path (i.e., the ampere-turn magnetic flux path).

Conceptually, the magnetic fields generated by the ampere-turns in each field pole member of active field pole members 204a, 204b, and 204c can be viewed as regions of magnetic potential at each of the pole faces at the end regions or pole shoes of the active field pole members. In the air gaps between the confronting surfaces of the conical magnets and their adjacent pole faces, the flux of the first flux path and the flux of the second flux path interact in a manner familiar to those skilled in the art, where such an interaction is useful to generate torque by an electric motor implementing rotor-stator structure 200, according to at least one embodiment of the present invention. The first and the second flux paths of rotor-stator structure 200 are efficient, at least in part, because the flux is contained within the core regions 506 (FIG. 5A) of field pole members 206 by the currents running through coils 208. The magnet flux generated by each of the conical magnets 220 interacts in a flux interaction region with the magnetic flux from pole faces of active field pole members 204. As such, flux leakage paths, if any, are generally limited to relatively very small regions at pole shoes 507a and 507b (FIG. 5A), both of which include the sides and the backs of field pole members 206. As the first and second flux paths are also mostly straight in the magnetically permeable material of field pole members 206, these field pole members are well suited to be implemented with anisotropic (e.g., grain-oriented), magnetic materials in an efficient manner. As such, field pole members 206 can be composed of any anisotropic, magnetic materials capable of carrying higher flux densities and lowering magnetic losses in the direction of magnetic orientation, such as along the grains of grain-oriented materials, as compared to the use of isotropic, non-grain oriented, magnetic materials.

To illustrate, consider that an exemplary anisotropic (e.g., grain-oriented) material can have a magnetic saturation value of 20,000 Gauss, whereas a typical isotropic lamination material, such as "M19" laminations, have a saturation value of 19,600 Gauss. Moreover, the applied field required for the anisotropic material to reach saturation is only 126 Oerstead as compared to 460 Oerstead for the isotropic material. Core losses for the anisotropic grain-oriented material (e.g., laminations of 0.014 inch thick) can be about 0.66 Watts per pound at 60 Hz with 15,000 Gauss induction. By contrast, a typical isotropic material can have core losses of about 1.64 Watts per pound under similar conditions. In view of the foregoing, the use of anisotropic materials in forming field pole members 206 is advantageous over the use of isotropic materials. According to at least one embodiment, the substantially straight shape of field pole members 206 enables effective use of anisotropic materials, unlike magnetic flux paths of traditional motors.

Unlike output torque generation of conventional motors, the output torque generated by rotor-stator structures 200 of various embodiments of the present invention need not be proportional to the radius from the axis of rotation on shaft 222 to the active air gaps 551a to 551d (FIG. 5B). All other factors being the same, increasing the radial distance of the pole faces and air gaps from shaft 222 does not change the output torque in the way that traditional motor design formulas indicate. For example, traditional motor design concepts teach that the regions carrying ampere-turn flux should be designed to have low reluctance paths, including the part of the ampere-turn magnetic flux path that is the air gap. According to various embodiments of the present invention, the ampere-turn flux path has a relatively high reluctance path through the space occupied by permanent magnets, such as conical magnets 220, yet peak torque production is relatively high in comparison to that of most traditional motors of the same size or weight (again, with other factors being equal). In a specific embodiment, the magnet materials that constitute conical magnets 220 have a magnet permeability value similar to that of air, and as such, the volume of each conical magnet 220 appears as an additional air gap to the ampere-turn magnetic circuit. In at least one embodiment, the output torque generated by an electrodynamic machine is proportional, in whole or in part, to the volumes of conical magnets 220.

In operation of rotor-stator structure 200, coils 208 are sequentially energized to cause rotation of rotor assembly 202. The energized coils generate magnetic potentials at the pole faces. These magnetic potentials tend to re-orient the internal field directions of the magnets (e.g., conical magnets 220) to the direction of the applied external field. The external field, in effect, presents an angularly-directed demagnetizing field to conical magnets 220 such that the demagnetizing field is capable of reaching relatively large amplitudes when a motor implementing rotor-stator structure 200 is under high torque loads. The intense demagnetizing field can detrimentally re-magnetize magnet materials of conical magnets 220 that have insufficient coercivity. For this reason, at least one embodiment of the present invention uses magnet materials suited for high torque loading and have: (1) a low B-to-adverse-applied-field intensity ratio, and (2) a relatively low recoil permeability, such as less than 1.3 in CGS units, for example.

In an embodiment of the present invention, the produced torque is through the natural inclination of the magnets, such as conical magnets 220, to seek the lowest energy position. Accordingly, the magnet poles of conical magnets 220, which can be permanent magnets, tend to rotate toward regions of greatest magnetic attraction and away from regions of magnetic repulsion, whereby such regions of "magnetic potential" are created at the air gaps at both ends of energized active field pole members 204 by the ampere-turn generated magnetic fields. Since a magnet having a relatively high coercivity will resist attempts to angularly displace the direction of its internal magnetic field, this resistance to angular displacement is manifested as mechanical torque on the body of the permanent magnet, thereby transferring torque to the shaft. As such, the magnets (e.g., conical magnets 220) can develop and then transfer torque to the shaft as useful output torque applied to a load.

Figure 6A:
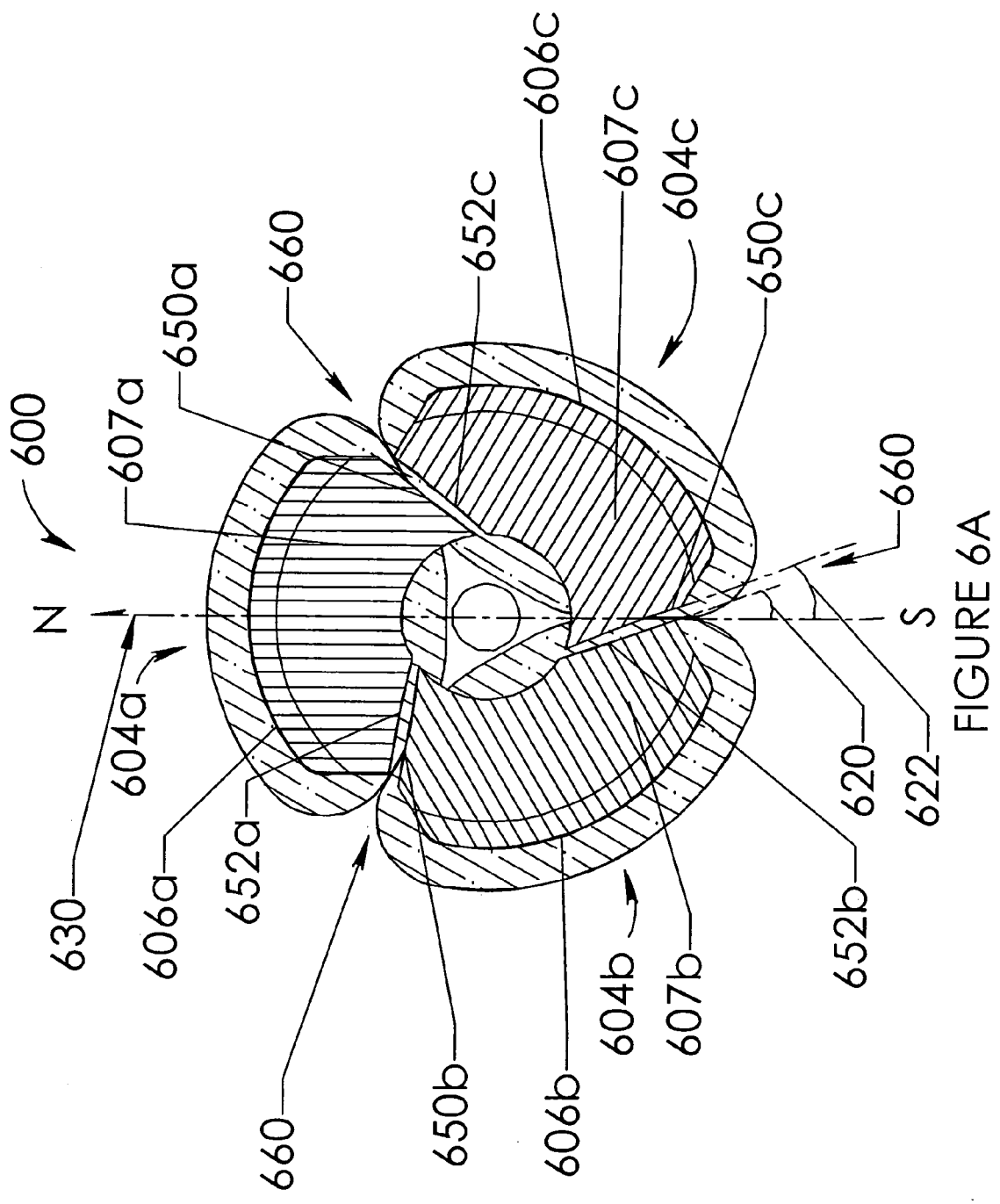
FIGS. 6A and 6B illustrate an end view of another exemplary rotor-stator structure, according to another embodiment of the present invention.
Figure 6B:
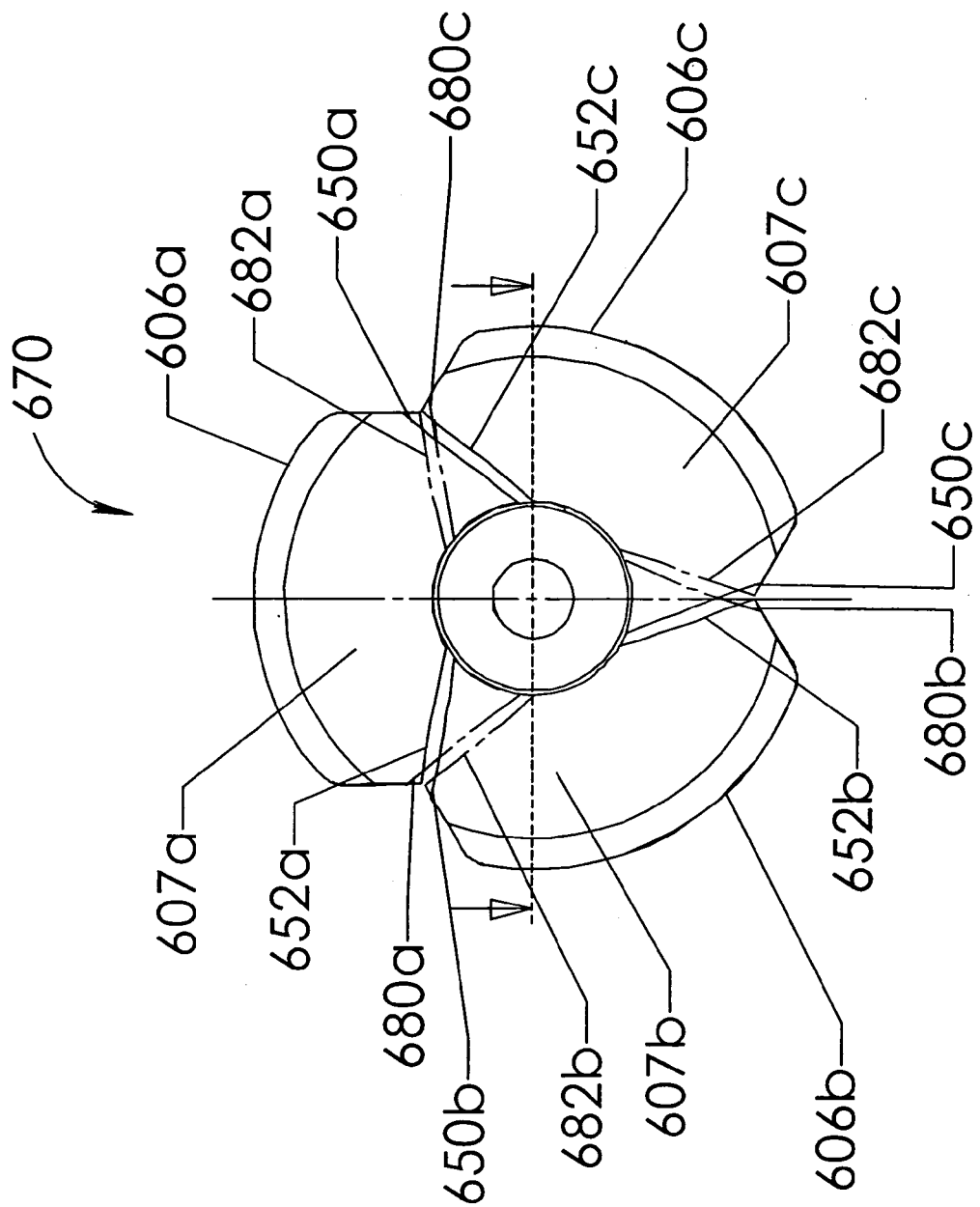

FIGS. 6A, 6B and 6C illustrate an end view 600 of another exemplary rotor-stator structure, according to another embodiment of the present invention. FIGS. 6A and 6B show end views 600 of a rotor-stator structure while FIG. 6C is a partial sectional view A—A of FIG. 6B. FIG. 6A shows active field pole members 604 each having a skewed pole face 607 at an end of a respective field pole member 606. Each skewed pole face 607 has a contoured surface that generally tracks the surface characteristics of that of a confronting surface portion of an adjacent magnet, such as conical magnet 220a, to form an air gap having, for example, a relatively constant air gap thickness. Air gap thickness generally refers to the orthogonal distance between a pole face and a confronting surface of a magnet. The skewed pole faces 607 are, at least in part, defined by surface edges and/or sides of field pole members 606 that are slightly angled or skewed with respect to the polarity of an adjacent magnet. Skewed edges and/or sides are shown in FIG. 6A as first skewed edges 650 and second skewed edges 652, both of which are configured as edges of field pole members 606 to form skewed field pole gaps 660 when active field pole members 604 are arranged in a rotor-stator structure. As an example, consider that first skewed edge 650c is configured to form an angle 622 with respect to at least one direction of polarization 630 of a magnet (not shown). Consider further that second skewed edge 652b is configured to form an angle 620 with respect to direction of polarization 630. Angles 620, 622 can be the same angle or can be any other angle that is suitable for forming field pole gaps 660 that are skewed in relation to the directions of polarization of one or more magnets. Note that FIG. 6C is a partial sectional view showing skewed edges being configured so that the radial plane of magnetic polarization 631 does not align with either of field pole edge 650 or field pole edge 652. In particular, field pole edge 650c and field pole edge 652b both do not align (i.e., are skewed) relative to plane of magnetization 631.

FIG. 6B is an end view 670 showing skewed pole face edges at both ends of field pole members 606. By implementing skewed field pole gaps 660 in a rotor-stator structure, detent torque ("cogging") is reduced. In at least one embodiment, skewed field pole gaps 660 are adapted for use with permanent magnets that are diametrically polarized, such as conical magnets 220. In this instance, end view 670 is an end view showing pole faces 607 that are configured to surface contours similar to that of an adjacent conical magnet 220a, pole faces 607 being similar to those shown in FIG. 6A. Also shown in FIG. 6B are first skewed edges 680 and second skewed edges 682, which are associated with pole faces at the other end of field pole members 606 (e.g., at the other pole shoe opposite than that associated with first skewed edges 650 and second skewed edges 652). First skewed edges 680 and second skewed edges 682 in this case have angles similar to those of first skewed edges 650 and second skewed edges 652, respectively, but face a magnet surface associated with conical magnet 220b, for example. As such, the angular directions of the field pole gaps formed by edges 650 and 652 are opposite in the angular direction of the field pole gaps formed by edges 680 and 682. Consequently, the diametrically polarized magnets will generally not align with a field pole gap having pole face sides similar to those that form field pole gap "G" between planes 310 and 320 (FIG. 3), which can be a source of cogging torque in an electric motor. Note that distance between edges 650 and 652, as well as between edges 680 and 682, can be configured to be as narrow as necessary to minimize the cogging effects of the field pole gaps.

Figure 7A:
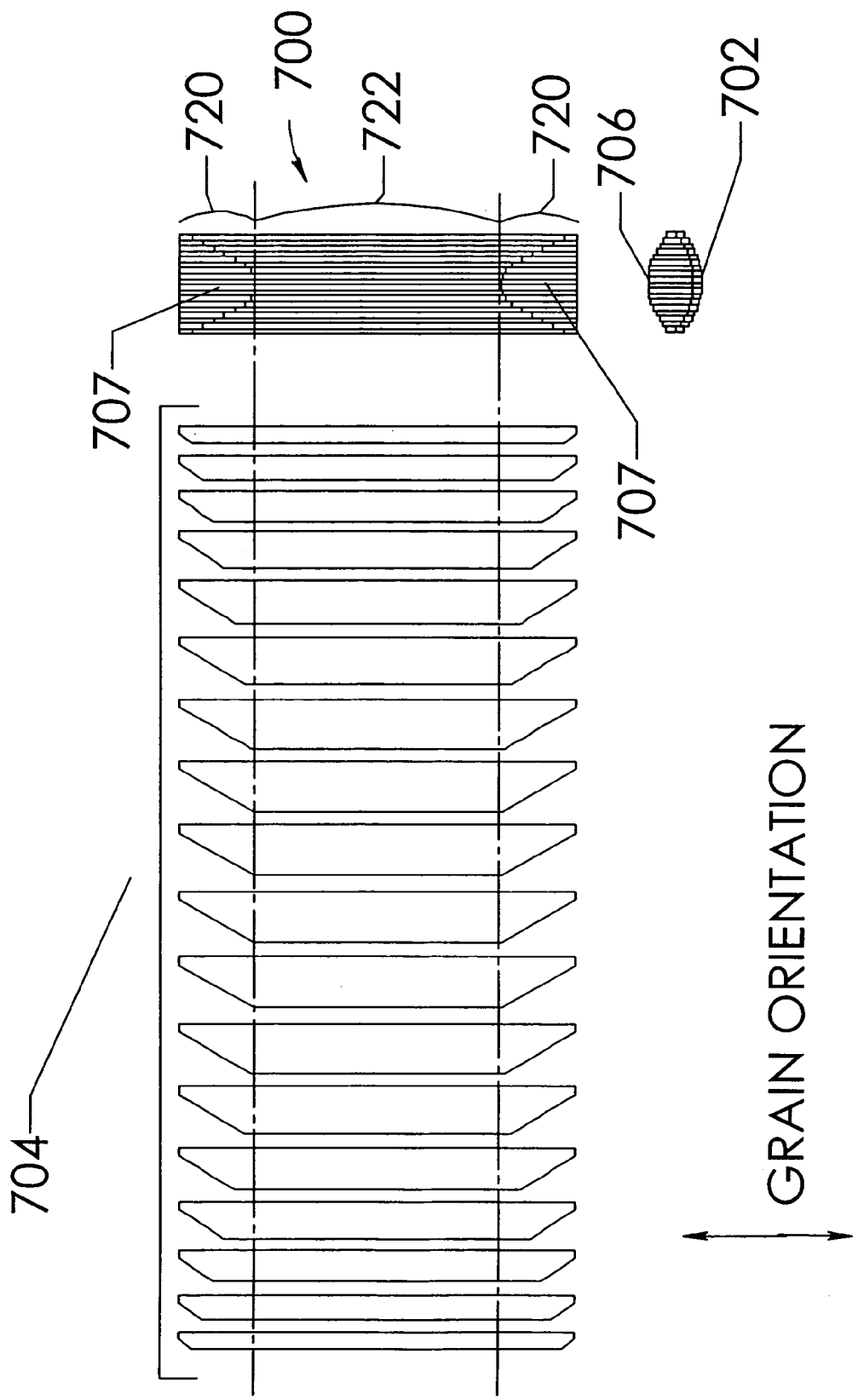
FIGS. 7A and 7B illustrate an exemplary field pole member, according to an embodiment of the present invention.
Figure 7B:
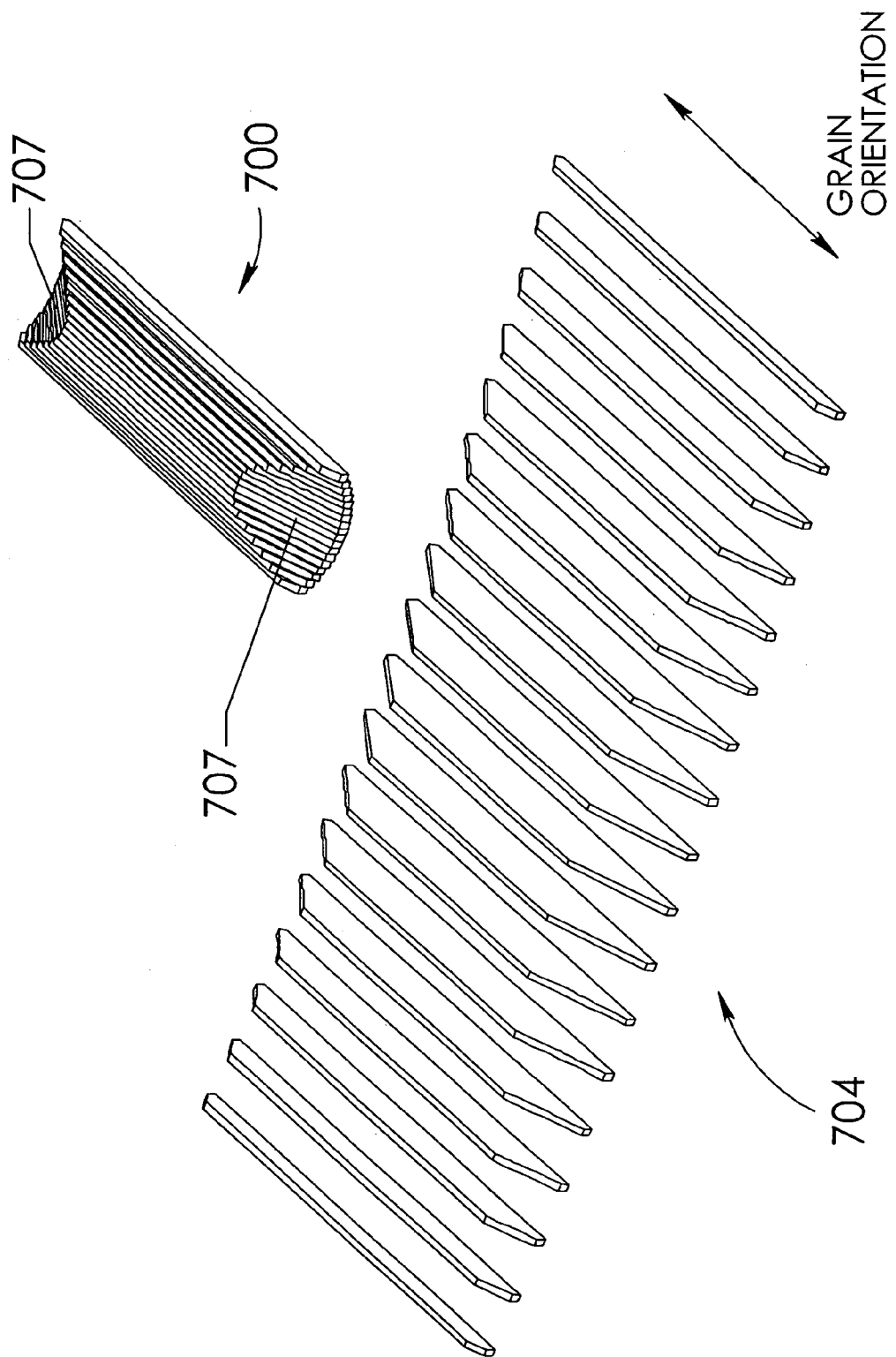

FIGS. 7A and 7B illustrate an exemplary field pole member, according to one embodiment of the present invention. Although each of field pole members 206a, 206b, and 206c can be composed of a single piece of magnetically permeable material (e.g., a piece formed by a metal injection molding process, forging, casting or any other method of manufacture), these field pole members can also be composed of multiple pieces, as is shown in FIGS. 7A and 7B. FIG. 7A depicts one of field pole members 206 as a stacked field pole member 700 composed of a number of laminations 704 integrated together. In this instance, stacked field pole member 700 has an outer surface 702 having a cylindrical outside diameter with an arc and a relatively straight inner surface 706 to increase the coil packing density while still leaving room for the rotating shaft. Field pole member end regions 720 generally include pole faces 707 for interacting with the flux of permanent magnets at each end of field pole member 700, whereas a central portion 722 generally includes a core region between pole faces 707, such as coil region 506 (FIG. 5A). A coil (not shown) can be wound more or less about central portion 722. FIG. 7B is a perspective view of stacked field pole member 700 and laminations 704, which are composed of an anisotropic material. In this example, the anisotropic material includes grain-oriented material.

Note that various winding patterns can be implemented to enhance performance. For example, a cantered or full-coverage winding can cover substantially all of the sides and/or the back of field pole member 700, at both ends of the structure, to reduce the flux that might leak from one field pole member to another. As such, the wire of a coil need not be wound perpendicular to the long axis of the field pole member, but at an oblique angle. With coils being placed close to the magnetic air gap, those coils can be more effective in reducing flux leakage.

Figure 8:
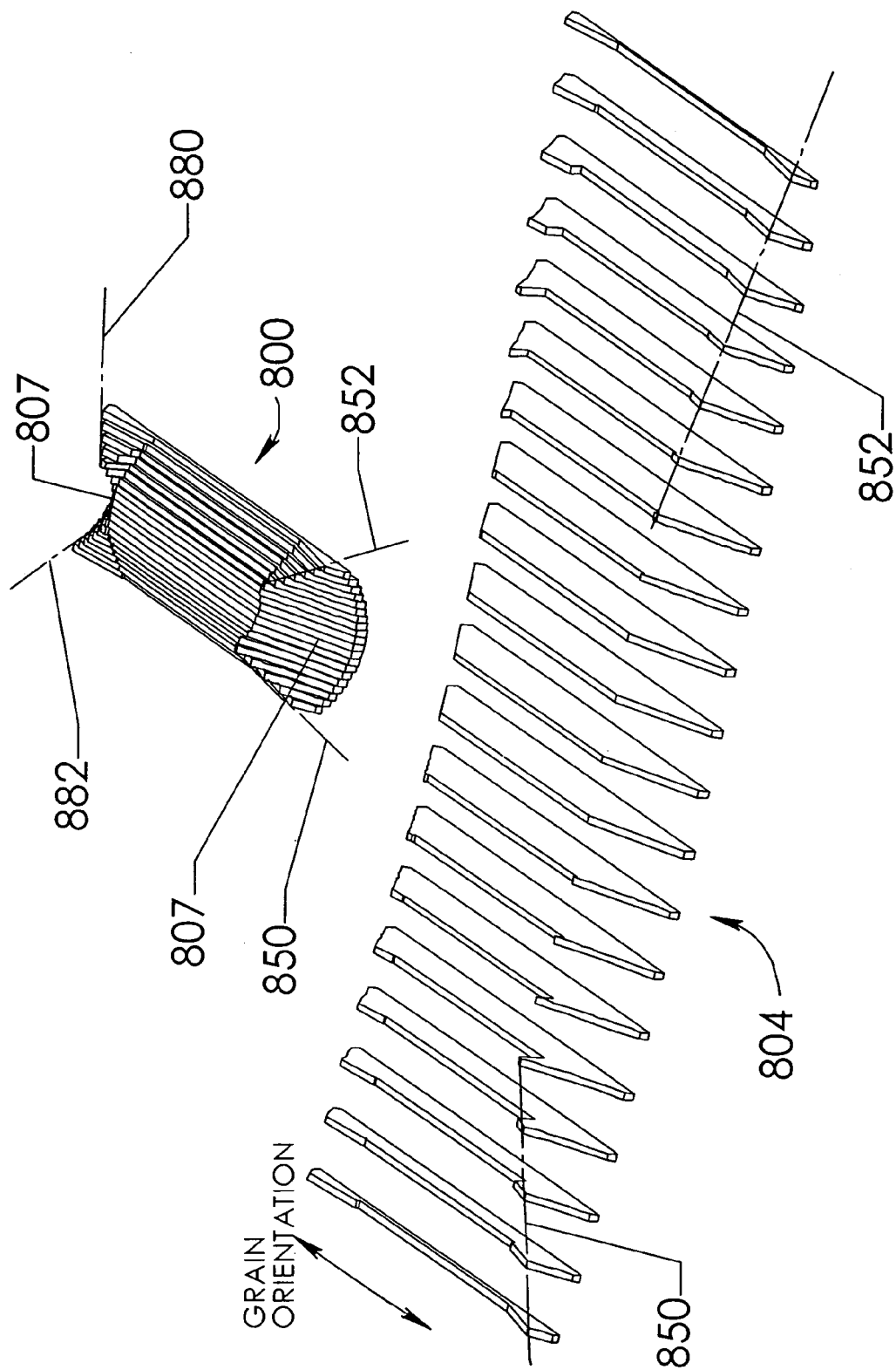
FIG. 8 illustrates another exemplary field pole member having skewed pole faces, according to a specific embodiment of the present invention.

FIG. 8 illustrates another exemplary field pole member having skewed pole faces, according to a specific embodiment of the present invention. As shown, stacked field pole member 800 is constructed from a number of laminations 804, similar to stacked field pole member 700. Laminations 804 are patterned to provide skewed pole faces 807. Pole face 807 is bound by both a first skewed edge 850 and a second skewed edge 852, whereas the other pole face 807 at the other pole shoe is bound by a first skewed edge 880 and a second skewed edge 882. Note that edges 850, 852, 880 and 882 can respectively correspond to edges 650, 652, 680, and 682 of FIG. 6B. In some cases, laminations 804 (as well as laminations 704) advantageously can be formed (e.g., stamped out) in a series of either similarly or differently patterned shapes from a single substrate (e.g., a sheet of metal or the like) in a manner that minimizes waste during manufacturing (i.e., almost all of the starting material can be efficiently utilized as an optimum number and/or size of laminations per substrate can be selected). Further, the manufacture of laminations 704 and 804 does not waste materials typically jettisoned to create circular holes in circular stator structures.

In some embodiments, laminations 704 and 804 can be assembled from laminated anisotropic (e.g., grain-oriented) sheet stock with the direction of magnetic orientation being oriented longitudinally, such as parallel to an axis of rotation. This is so that flux can be easily conducted axially from one end of the motor to the other. The laminations can be electrically insulated from each other, which can reduce eddy current losses. In one embodiment, laminations 704 and 804 are composed of grain-oriented steel and provide various field pole members with high permeability, low loss and/or high saturation levels in a relatively low cost material. One type of anisotropic material suitable for implementing laminations 704 and 804 is cold-rolled-grain-oriented steel, or "CRGO lamination steel." To illustrate the advantages of using grain-oriented lamination in accordance with at least one embodiment, cold rolled grain oriented steel can have a permeability of 50,000 while subjected to an applied field of 10,000 Gauss in comparison to commonly-used isotropic laminate steel (e.g., "M19" laminates) having a permeability of about 5950, under the same conditions. Note that permeability, as described above, is in terms of direct current ("DC") permeability. Field pole members can be made from many different magnetically permeable materials, such as silicon iron alloys, nickel iron alloys, cobalt nickel alloys, magnetic powdered alloys, soft magnetic composites, and the like, according to various embodiments of the present invention. Soft magnetic composite materials, which are also known as "SMC materials," are composed of compacted, electrically insulated particles that are also magnetically permeable. As such, SMC materials exhibit relatively low eddy current losses when compared to traditional SiFe lamination materials at relatively high frequencies. Another significant advantage of SMC materials is its ability to be formed in three dimensions through use of properly designed compaction molds and dies.

FIGS. 9A to 9M illustrate examples of other-shaped permanent magnets that can be implemented in a rotor-stator structure, according to various embodiments of the present invention. Although the permanent magnets shown in FIG. 2 are conical in shape, the term "conical" is intended to be construed broadly to include one or more shapes that form one or more surfaces, or portions thereof, that when coaxially mounted on a shaft, are at an angle to the shaft such that at least one surface, when extended, would intersect an axis of rotation. So, the term "conical magnet" is meant to cover any configuration of magnet that has at least a portion of a surface that is conical or tapered toward a point coaxial with, or on, an axis of rotation. For example, at least one type of conical magnet has one or more surfaces whereby the cross-sections of the magnet at each of those surfaces generally (or on average) either increase or decrease progressively along the axial length of the magnet. In at least one specific embodiment, a relevant dimension for describing a portion of conical magnet surface is a surface boundary, such as a contoured surface area that can be oriented in space with respect to a line.

Figure 9A:
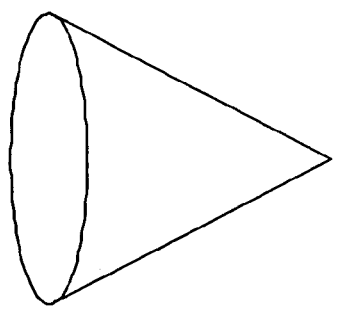
FIGS. 9A–9M illustrate examples of other-shaped permanent magnets that can be implemented in an exemplary rotor-stator structure, according to various embodiments of the present invention.
Figure 9B:
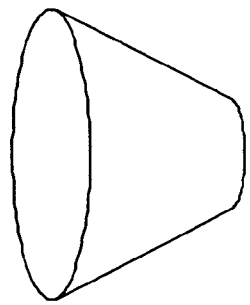
Figure 9C:
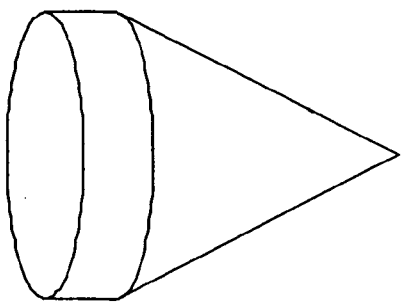
Figure 9D:
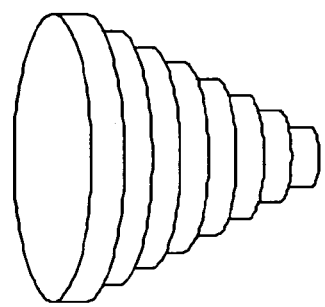
Figure 9E:
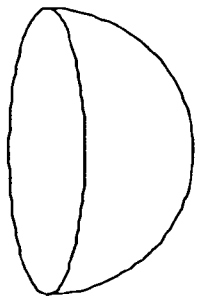
Figure 9F:
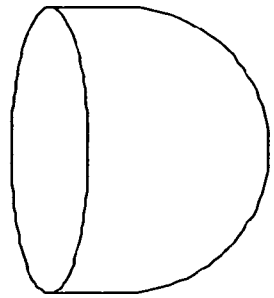
Figure 9G:
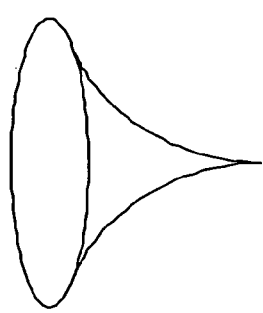
Figure 9H:
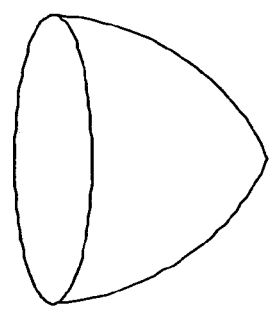
Figure 9I:
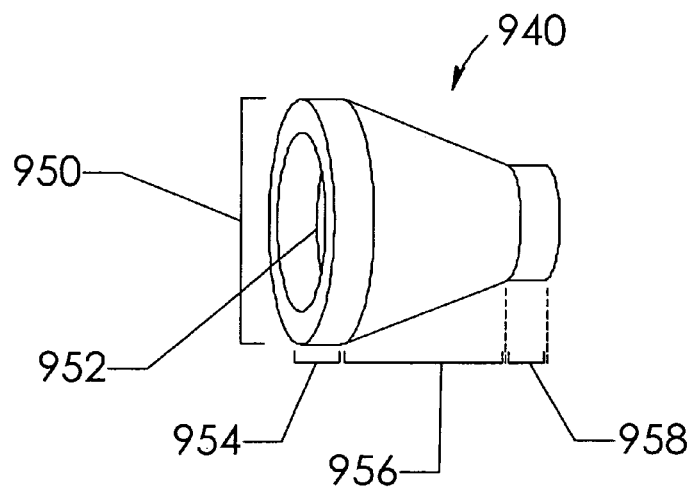

FIG. 9A shows a full cone-shaped magnet as an example of a conical magnet, whereas FIG. 9B depicts a conical magnet being a truncated cone magnet described as a "frustum of a right circular cone," which is a frustum created by slicing the top off a right circular cone (e.g., the slice forming an upper base parallel to the lower base, or outer surface, of the right circular conical magnet). Note that other cone angles can be used other than is shown in FIG. 9A. FIG. 9C shows that a conical magnet can include cylindrical portions added to the large diameter end (or, in some cases, to the small diameter end, such as shown in FIG. 9I) to optimize magnetic flux in the circuit. FIG. 9D illustrates a conical magnet being of a "stepped" or graduated form. FIGS. 9E and 9F show examples of alternative shapes suitable for implementing a permanent magnet in accordance with embodiments of the present invention, where a conical magnet can be a hemispherically-shaped magnet. FIGS. 9G and 9H are general representations showing that conical magnets of various embodiments can have any type of concave surface and any type of convex surface, respectively.

Figure 9J:
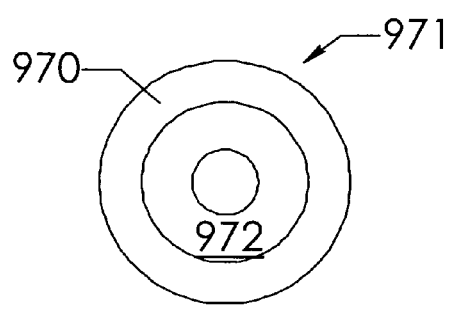
Figure 9K:
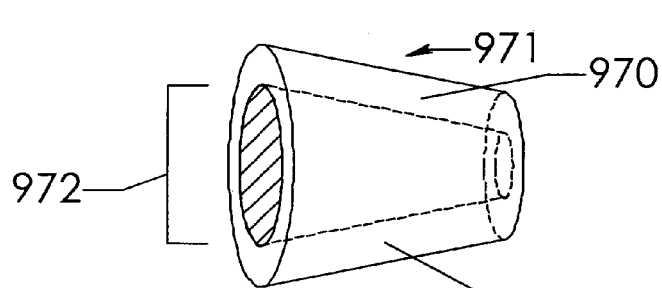

FIG. 9I shows an exemplary conical magnet in accordance with one embodiment of the present invention. Here, conical magnet 940 includes an outer surface 950 in which a cavity 952 is formed. Cavity 952 is optional and can be used to house bearings or the like. In some embodiments, cavity 952 extends through cylindrical surfaces 954 and 958. Conical magnet 940 includes three surfaces: a first cylindrical surface 954, a conical surface 956 and a second cylindrical surface 958. In various embodiments, conical magnet 940 can include: fewer or more surfaces, cylindrical surfaces having larger or small diameters, steeper or shallower angles of inclination for conical surface 956, etc. FIGS. 9J and 9K show an end view and a side view, respectively, of an exemplary conical magnet, according to one embodiment of the present invention. Conical magnet 971 is composed of two conical magnets 970 and 972. In this example, conical magnet 972 is disposed (e.g., inserted) within conical magnet 970. In one embodiment, conical magnet 970 is composed of NdFe magnetic material (or a variant thereof) and conical magnet 972 is composed of a ceramic magnetic material.

Figure 9L:
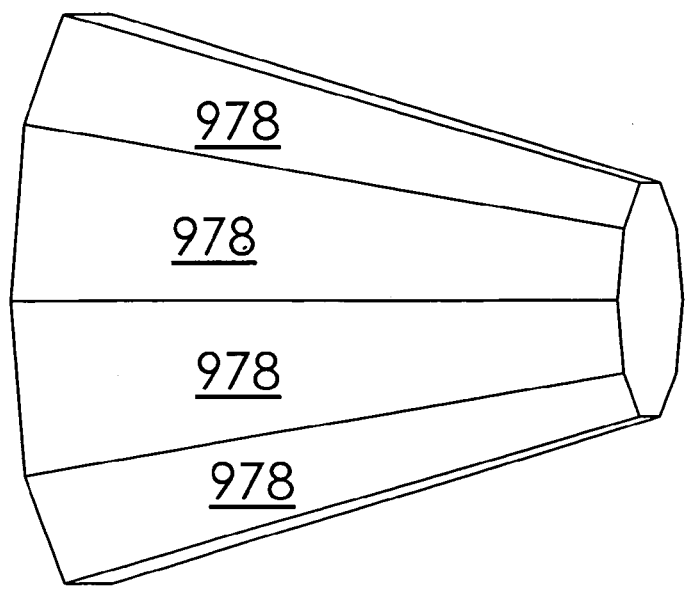
Figure 9M:
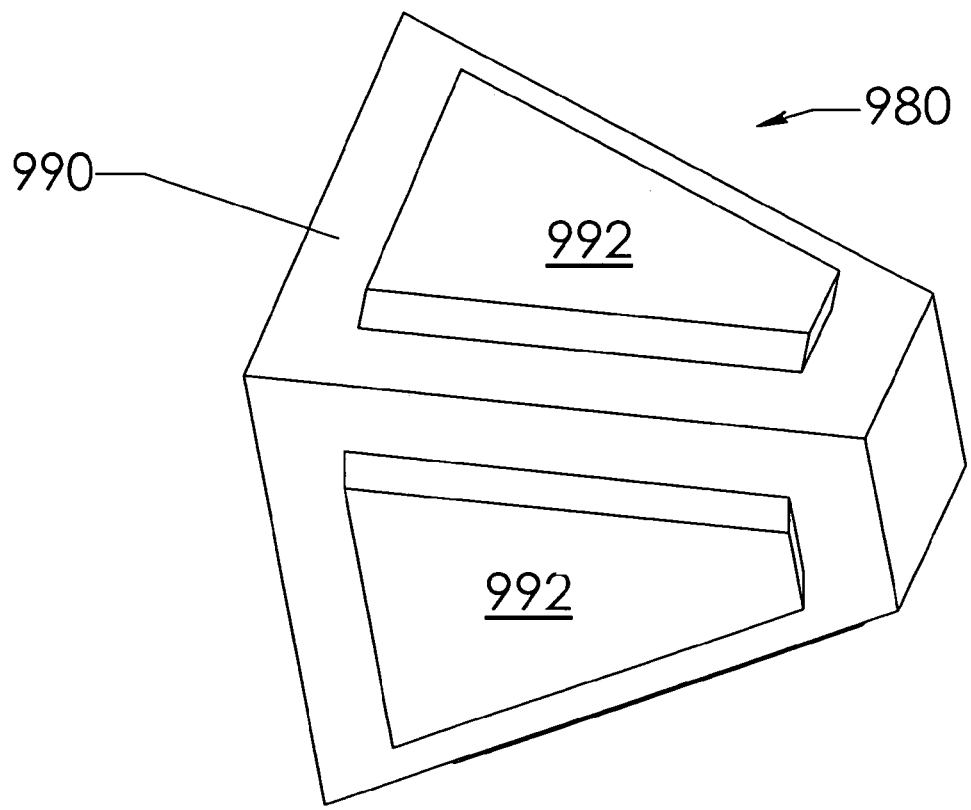

FIGS. 9L and 9M illustrate yet other conical magnets in accordance with yet other embodiments of the present invention. FIG. 9L illustrates a pyramidal-shaped magnet as a conical magnet, albeit truncated, formed with any number of truncated triangular surfaces 978. FIG. 9M illustrates a conical magnet 980 of at least one embodiment, where conical magnet 980 includes a truncated pyramidal magnet 990 including magnetic regions 992 formed either therein or thereon. Magnetic regions 992 include magnetic material that is different that that of truncated pyramidal magnet 990. Each of those magnetic regions 992 can be selected to have any predetermined polarity. In one embodiment, truncated pyramidal magnet 990 is four-sided and is composed of a ceramic material (e.g., magnetic material), and each magnetic region 992 (two of which are hidden from view) is composed of NdFe magnetic material and are formed upon truncated pyramidal magnet 990. In other embodiments, pyramidal magnet 990 can have any number of sides.

In a specific embodiment of the present invention, conical magnets are anisotropic, diametrically magnetized, and shaped as a truncated cone with about 30 degrees of cone angle relative to an axis of rotation. At least one advantage of this magnet configuration is that such diametric conical magnets can be magnetized in the same direction as the original magnetic orientation of the magnet material, which provides a higher energy product for the magnet (i.e., a more powerful magnet). Anisotropic magnets are also relatively easy to manufacture and have relatively high magnetic efficiency per unit magnet volume. Another advantage of a diametric (i.e., 2 pole) magnet is that in a motor having three active field pole members and three phases, there can be only one electrical revolution for each mechanical revolution of the motor. Accordingly, the diametric magnet, in whole or in part, reduces eddy current losses, hysteresis ("core" or "iron") losses and electrical switching losses in a motor drive circuit. In some embodiments, a conical magnet can: (1) include a steel core instead of being solid magnet material, (2) be constructed from ring magnets exhibiting good coercivity, (3) be constructed from arc-segment magnets, (4) be molded directly onto the shaft, (5) be radially polarized, (6) include a hollow core instead of being solid magnet material, or can include any other similar characteristics.

Figure 10:
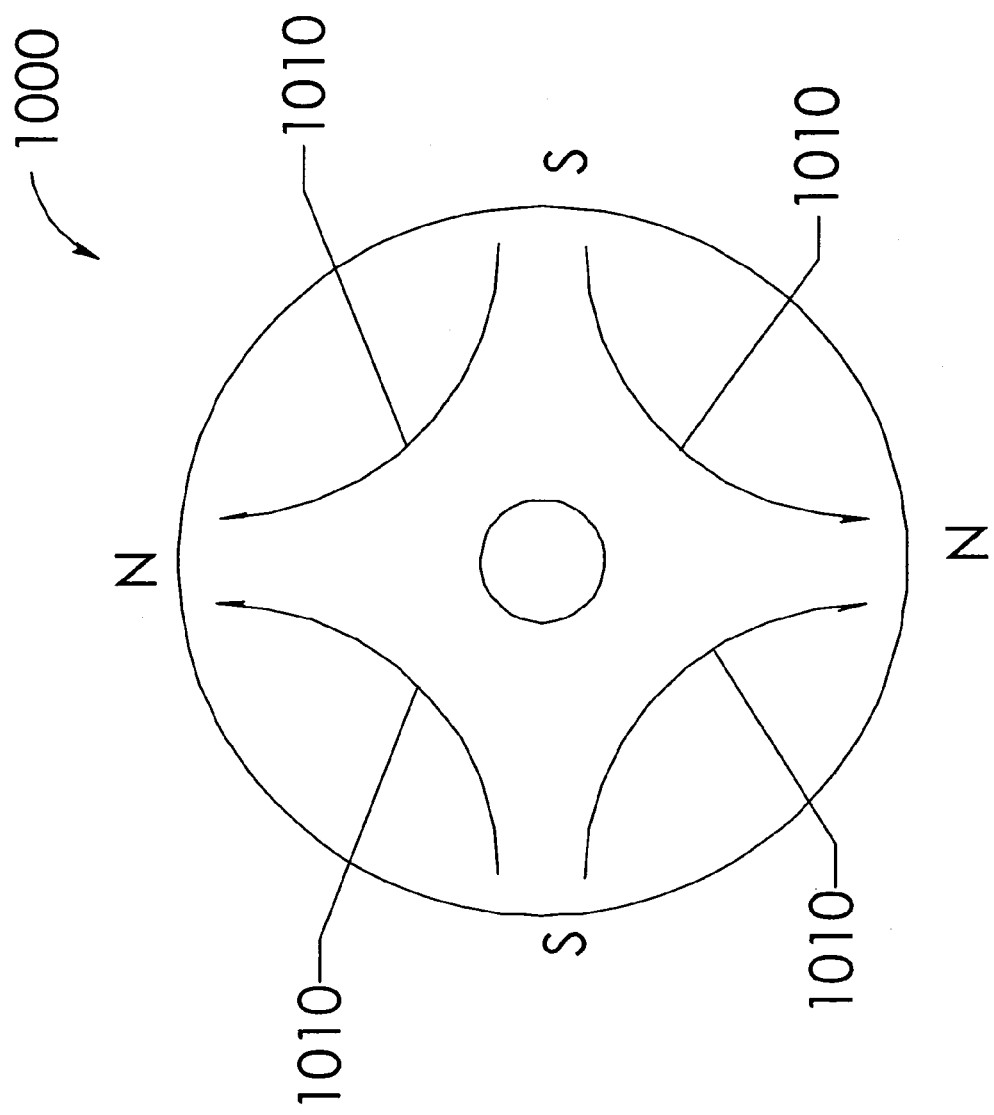
FIG. 10 shows a multiple pole magnet, according to an embodiment of the present invention.

FIG. 10 shows a multiple pole magnet, according to one embodiment of the present invention. In this example, permanent magnet 1000 is a four-pole magnet being magnetically oriented to have arcuate magnetic paths 1010 from south poles ("S") to north poles ("N"). Other numbered poles and magnet orientations are within the scope and spirit of the present invention. As used herein, the term "monolithic" as applied to a permanent magnet, suggests that the permanent magnet is composed of integrated magnetic poles, such that the permanent magnet is non-discrete and is substantially homogenous in structure. As such, a monolithic permanent magnet lacks any interfaces between the magnetic poles. A monolithic magnet therefore is composed of continuous magnet material. By contrast, permanent magnet 1000 can be composed of separate magnets (i.e., non-monolithic), each contributing an outward facing north or south pole, whereby interfaces exist between separate subcomponents. As such, a non-monolithic magnet therefore is composed of noncontinuous magnet material. Note that the term "monolithic" can also apply to field pole members and active field pole members.

Figure 11:
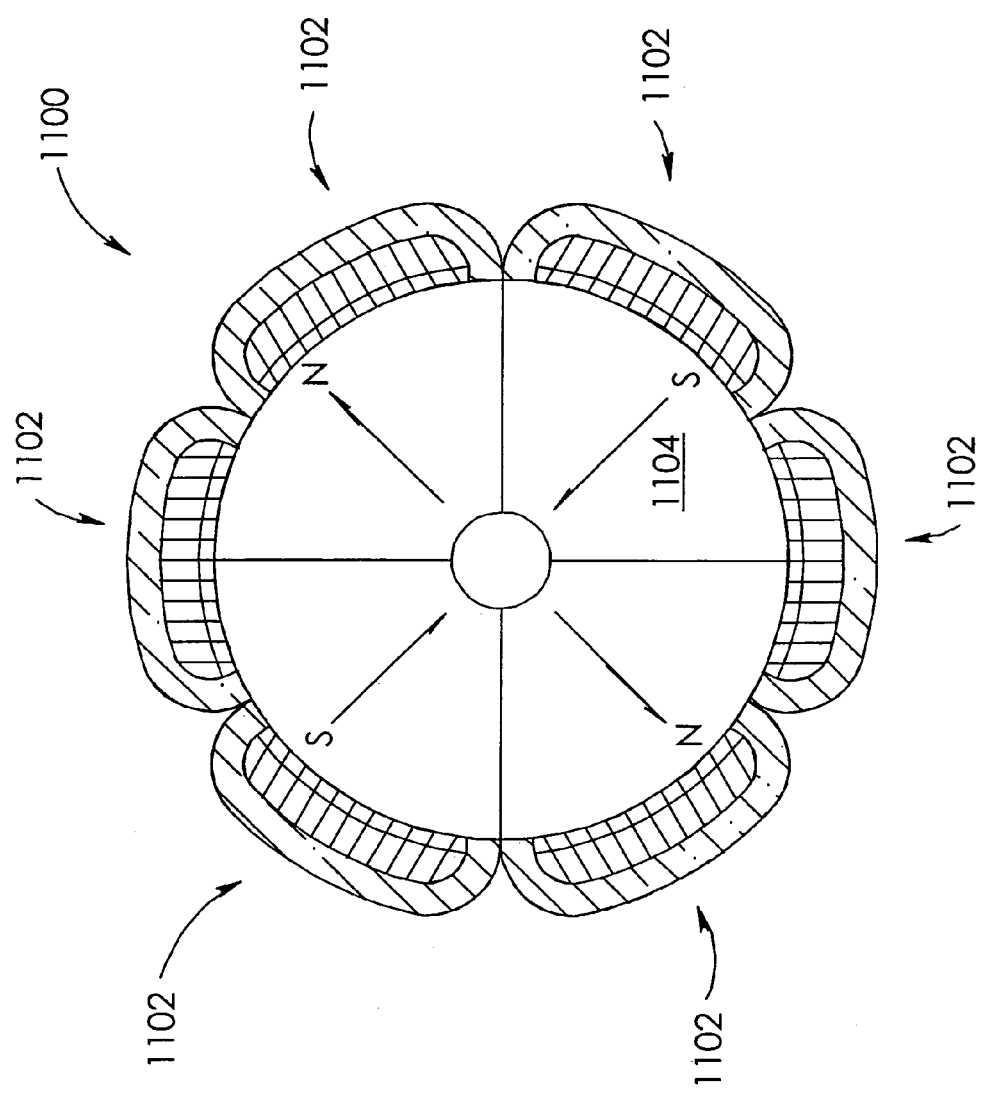
FIG. 11 shows another rotor-stator structure as an alternate embodiment of the present invention.

FIG. 11 shows rotor-stator structure 1100 as an alternate embodiment of the present invention. Generally, a quantity of three active field pole members efficiently uses a cylindrical volume or space that is typically available inside the motor or generator. As such, "three" active field pole members are generally used to provide a relatively high packing density. But to provide more balanced operation, more than three active field pole members can be used. As shown, six active field pole members 1102 are arranged coaxially to and positioned equidistantly about an axis of rotation. Also, a four-pole magnet 1104 is positioned adjacent to the pole faces of active field pole members 1102. In this instance, four-pole magnet 1104 is a composite of individual magnet arc-segments. Rotor-stator structure 1100 can provide more balance magnetically relative to rotor-stator structures that include three active field pole members, because coils of opposing active field pole members 1102 can generally be excited at the same time. Other numbers of active field pole members and other even numbers of magnet poles can suitably be combined to implement rotor-stator structures of the present invention.

In one embodiment of the present invention, an exemplary rotor-stator structure is disposed in an electrical motor to generate a torque amplitude that depends on the volume of the magnets, the vector directions of the interacting fields in the flux interaction regions, the flux density in flux interaction regions, the area of the air gaps, and the area of the pole faces. So, the higher the flux density produced by the permanent magnets and the higher the flux density produced by the active field pole members, the higher the torque that will be developed until significant saturation is reached in the field pole members. The magnet materials of such a rotor-stator structure should have sufficient coercivity to prevent partial or total demagnetization in an intended application.

A practitioner of ordinary skill in the art requires no additional explanation in making and using the embodiments of the rotor-stator structure described herein but may nevertheless find some helpful guidance by examining the following references in order from most to least preferred: "IEEE 100: The Authoritative Dictionary of IEEE Standard Terms,"Institute of Electrical and Electronics Engineers (Kim Breitfelder and Don Messina, eds., 7th ed. 2000), "General Motor Terminology," as defined by the Small Motor and Motion Association ("SMMA"), and "Standard Specifications for Permanent Magnet Materials: Magnetic Materials Producers Association ("MMPA") Standard No. 0100-00," International Magnetics Association.

The foregoing description, for purposes of explanation, used specific nomenclature to provide a thorough understanding of the invention. However, it will be apparent to one skilled in the art that specific details are not required in order to practice the invention. In fact, this description should not be read to limit any feature or aspect of the present invention to any embodiment; rather features and aspects of one embodiment may readily be interchanged with other embodiments. For example, although the above description of the embodiments related to a motor, the discussion is applicable to all electrodynamic machines, such as a generator. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications; they thereby enable others skilled in the art to best utilize the invention and various embodiments with various modifications as are suited to the particular use contemplated. Notably, not every benefit described herein need be realized by each embodiment of the present invention; rather any specific embodiment can provide one or more of the advantages discussed above. It is intended that the following claims and their equivalents define the scope of the invention.

The invention claimed is:

1. A rotor-stator structure for electrodynamic machines comprising:
   conical magnets having conical surfaces arranged axially on an axis of rotation such that said conical surfaces face each other, said conical magnets including at least two conical magnets being positioned so that the directions of polarization of said at least two conical magnets are in substantially opposite directions; and
   field pole members arranged coaxially to said axis and having flux interaction surfaces formed at the ends of said field pole members and adjacent to portions of said conical surfaces that confront said flux interaction surfaces,
       each of said field pole members forming a field pole gap with another of said field pole members,
       said flux interaction surfaces and said portions of said conical surfaces defining air gaps so that each of said conical magnets establishes an air gap with each of said field pole members,
   wherein said flux interaction surfaces are configured to magnetically couple said field pole members to said conical magnets,
   wherein said air gaps, said conical magnets and said field pole members are sufficient to form a closed flux path that passes through at least two of said field pole members in different directions and through said at least two conical magnets in substantially opposite directions.

2. The rotor-stator structure of claim 1 further comprising a shaft on which said conical magnets are affixed, said shaft defining said axis of rotation.

3. The rotor-stator structure of claim 1 wherein said conical surfaces each having an angle of inclination from said axis of rotation, said angle being from about 10 degrees to about 80 degrees.

4. The rotor-stator structure of claim 1 wherein each of said field pole members further comprises:
   a magnetically permeable material that is continuous from one end of each field pole member to the other end; and
   at least a portion that is configured to accept an element for generating ampere-turn ("AT") flux.

5. The rotor-stator structure of claim 1 further comprising a coil wound about each of said field pole members to form active field pole members.

6. The rotor-stator structure of claim 5 wherein said rotor-stator structure excludes black-iron, thereby decreasing hysteresis losses as well as materials for manufacturing an electrodynamic machine.

7. The rotor-stator structure of claim 1 wherein at least one of said field pole members is substantially straight.

8. The rotor-stator structure of claim 1 wherein said field pole members and said conical magnets are arranged to minimize linear deviations in a path portion of a magnetic flux path coincident with a substantially straight line extending from a surface portion of a first conical magnet to a surface portion of a second conical magnet, said path portion terminating at said surface portions.

9. The rotor-stator structure of claim 1 wherein said rotor-stator structure is configured to generate magnetic flux paths consisting essentially of:
   said first conical magnet;
   said second conical magnet;
   at least one of said field pole members; and
   two or more air gaps.

10. The rotor-stator structure of claim 1 wherein said field pole members comprise laminations to minimize eddy currents, thereby reducing power losses.

11. The rotor-stator structure of claim 10 wherein said laminations are formed from a substrate composed of a magnetically permeable material in a manner that reduces wastage of said magnetically permeable material.

12. The rotor-stator structure of claim 10 wherein said laminations comprise a plurality of magnetically permeable laminations at least one of which is anisotropic.

13. The rotor-stator structure of claim 1 further comprising a coil wound about at least one of said field pole members to form at least one active field pole member.

14. The rotor-stator structure of claim 13 wherein said at least one field pole member is shaped to minimize manufacturing complexity associated with winding said coil on said at least one field pole member by avoiding winding said coil via a slot.

15. The rotor-stator structure of claim 1 wherein one conical magnet of said conical magnets has a first direction of polarization and another conical magnet of said conical magnets has a second direction of polarizations said first direction of polarization being at a polarization angle from said second direction of polarization to minimize detent torque, said polarization angle being any angle from about 150 degrees to 180 degrees.

16. The rotor-stator structure of claim 1 wherein each of said flux interaction surfaces her comprises a skewed flux interaction surface to reduce field pole gaps between adjacent field pole members, thereby minimizing detent torque.

17. The rotor-stator structure of claim 16 wherein said skewed flux interaction surface includes a first edge defining a first side of a field pole gap and a second edge defining a second side of another field pole gap, whereby said first edge and said second edge maintain angles that do not align with a direction of polarization of at least one of said conical magnets, wherein one first edge of a first field pole member and one second edge of a second field pole member form said field pole gap.

18. The rotor-stator structure of claim 1 wherein each of said field pole members is an elongated field pole member having a length dimension in an axial direction greater than a width dimension.

19. The rotor-stator structure of claim 1 wherein said flux path passes through at least two of said field pole members in different directions.

20. The rotor-stator structure of claim 1 wherein said directions of polarization exclude directions that are parallel to said axis of rotation.

21. The rotor-stator structure of claim 1 wherein said directions of polarization are configured to form a flux path portion of said closed flux path within the interior of each of said conical magnets, said flux path portion extending through a plane that includes said axis of rotation.

22. The rotor-stator structure of claim 21 wherein said flux path portion extends from a first point to a second point, wherein said first point and said second point lie on conical surface portions associated with the same conical surface.

23. The rotor-stator structure of claim 22 wherein said directions of polarization are each principally perpendicular to said axis of rotation.

24. The rotor-stator structure of claim 23 wherein said directions of polarization are each perpendicular to said axis of rotation.

* * * * *

UNITED STATES PATENT AND TRADEMARK OFFICE
CERTIFICATE OF CORRECTION

PATENT NO.       : 7,061,152 B2                                              Page 1 of 1
APPLICATION NO.  : 11/021417
DATED            : June 13, 2006
INVENTOR(S)      : John Patrick Petro et al.

It is certified that error appears in the above-identified patent and that said Letters Patent is hereby corrected as shown below:

Col 24 in claim 16, line 2, please replace "her" with --further--.

Signed and Sealed this

Nineteenth Day of December, 2006

JON W. DUDAS
*Director of the United States Patent and Trademark Office*